United States Patent
Popp

(10) Patent No.: US 8,495,916 B2
(45) Date of Patent: Jul. 30, 2013

(54) MOUNTING APPARATUS FOR A PRESSURE GAGE

(75) Inventor: Michael A. Popp, LaPorte, IN (US)

(73) Assignee: Dwyer Instruments, Inc., Michigan City, IN (US)

( * ) Notice: Subject to any disclaimer, the term of this patent is extended or adjusted under 35 U.S.C. 154(b) by 0 days.

(21) Appl. No.: 13/612,010

(22) Filed: Sep. 12, 2012

(65) Prior Publication Data

US 2013/0000414 A1  Jan. 3, 2013

Related U.S. Application Data

(62) Division of application No. 12/716,671, filed on Mar. 3, 2010, now Pat. No. 8,307,712.

(60) Provisional application No. 61/157,975, filed on Mar. 6, 2009.

(51) Int. Cl.
*G01L 7/08* (2006.01)
*G01L 7/00* (2006.01)

(52) U.S. Cl.
USPC .............................................. 73/700; 73/706

(58) Field of Classification Search
USPC ............................................... 73/700–756
See application file for complete search history.

(56) References Cited

U.S. PATENT DOCUMENTS

| 1,047,911 A | 12/1912 | Barrus |
| 1,399,117 A | 12/1921 | Hastings |
| 2,358,613 A | 9/1944 | Angst |
| 3,397,319 A | 8/1968 | Locke |
| 3,429,333 A | 2/1969 | Schoepe et al. |
| 3,611,797 A * | 10/1971 | Pugnaire ............ 73/862.632 |
| 3,800,736 A | 4/1974 | Krohn |
| 3,862,416 A | 1/1975 | Phillips et al. |
| 4,011,759 A | 3/1977 | Phillips et al. |
| 4,030,365 A | 6/1977 | Phillips et al. |
| 4,347,744 A | 9/1982 | Buchanan |
| 4,374,475 A | 2/1983 | Hestich |
| 4,385,525 A | 5/1983 | Phillips et al. |
| 4,527,434 A * | 7/1985 | White ................ 73/862.634 |
| 4,725,700 A | 2/1988 | Zoludow |
| 4,798,090 A | 1/1989 | Heath et al. |
| 4,827,095 A | 5/1989 | Clark et al. |
| 4,828,090 A | 5/1989 | Matsushita |
| 4,841,782 A | 6/1989 | Buchanan |
| 4,870,395 A | 9/1989 | Belano |
| 4,890,497 A | 1/1990 | Cahill |
| 4,938,076 A | 7/1990 | Buchanan |
| 5,012,678 A | 5/1991 | Buchanan |
| 5,061,832 A | 10/1991 | Squires |
| 5,085,070 A * | 2/1992 | Miller et al. ................ 73/105 |
| 5,183,983 A | 2/1993 | Knop |
| 5,352,858 A | 10/1994 | Keck |
| 2,722,837 A | 11/1995 | Dwyer |
| 5,652,391 A | 7/1997 | Kingsford |

(Continued)

FOREIGN PATENT DOCUMENTS

| CN | 87208989 | 3/1988 |
| CN | 101149303 | 3/2008 |

*Primary Examiner* — Andre Allen
(74) *Attorney, Agent, or Firm* — Barnes & Thornburg LLP

(57) ABSTRACT

A gage having a motion detection mechanism magnetically attached to a pressure sensing diaphragm. The motion detection mechanism is magnetically coupled to a pointer rotation mechanism configured to indicate the position of the diaphragm and the corresponding pressure sensed by the diaphragm.

3 Claims, 17 Drawing Sheets

U.S. PATENT DOCUMENTS

Figure 1:
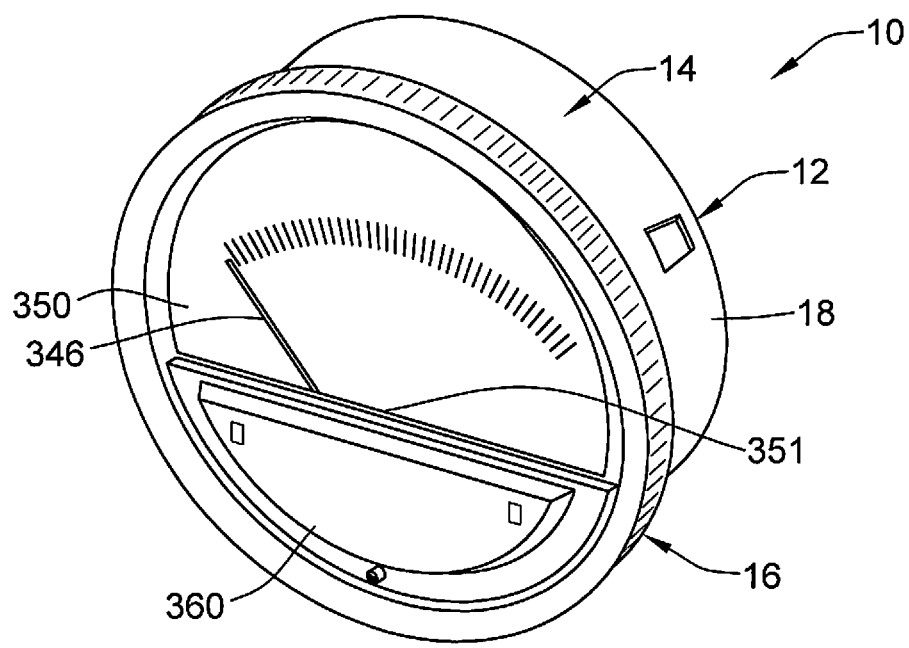

| | | |
|---|---|---|
| 6,089,098 A | 7/2000 | Tylisz et al. |
| 6,433,700 B1 | 8/2002 | Malewski et al. |
| 6,481,291 B1 * | 11/2002 | Lia et al. ............ 73/715 |
| 6,604,425 B1 * | 8/2003 | Hsu et al. ............ 73/718 |
| 6,789,434 B2 | 9/2004 | Peterson |
| 6,807,865 B2 | 10/2004 | Troyer |
| 6,981,421 B2 | 1/2006 | Palmer et al. |
| 7,073,385 B2 | 7/2006 | Troyer |
| 7,249,517 B2 | 7/2007 | Heuer et al. |
| 7,281,490 B2 | 10/2007 | Buchanan |
| 7,600,427 B2 | 10/2009 | Palmer et al. |
| 2004/0083816 A1 * | 5/2004 | Lia et al. ............ 73/715 |
| 2004/0237660 A1 * | 12/2004 | Palmer et al. ......... 73/735 |

* cited by examiner

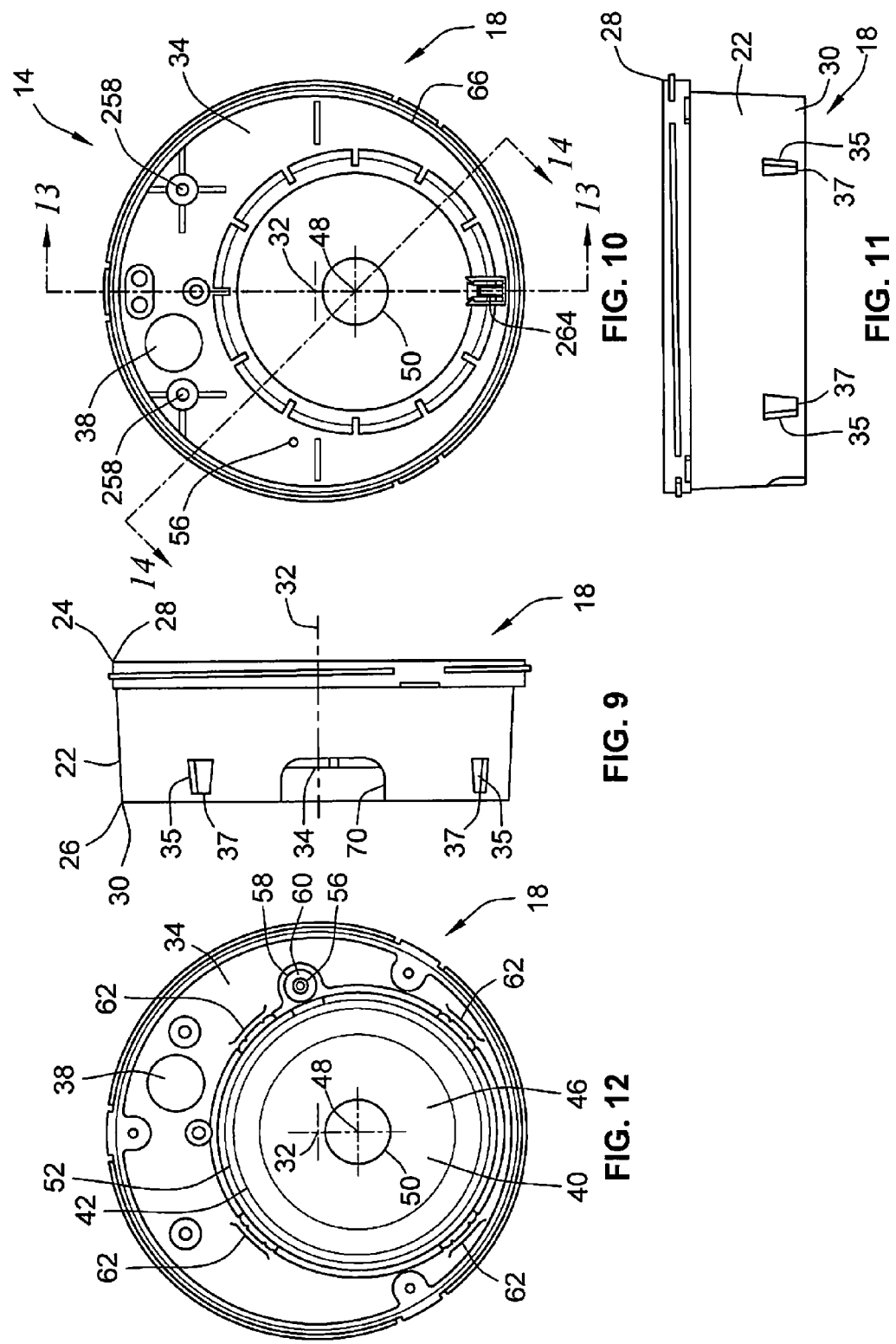

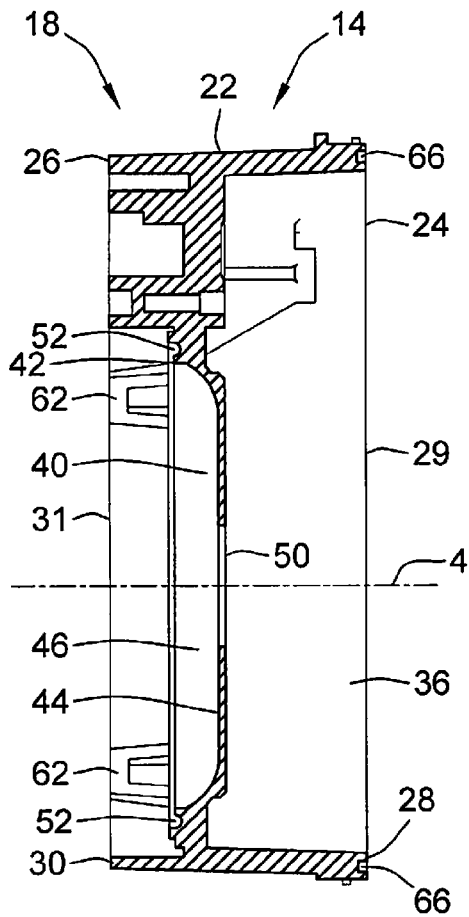
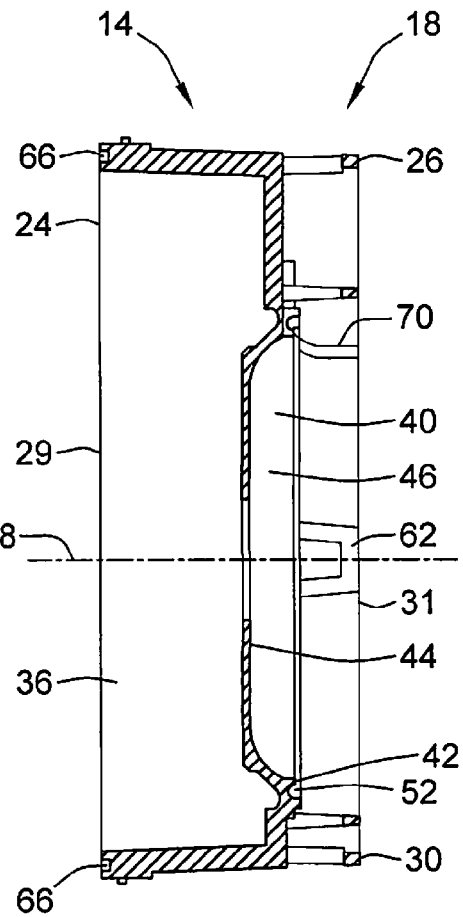
FIG. 13      FIG. 14
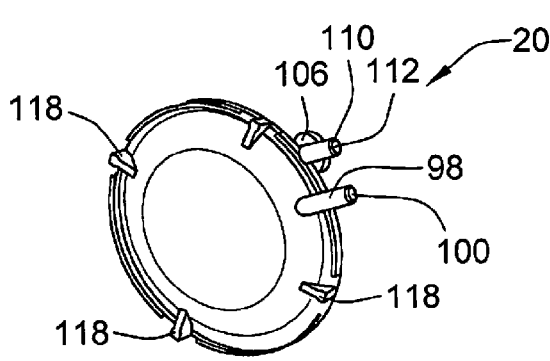
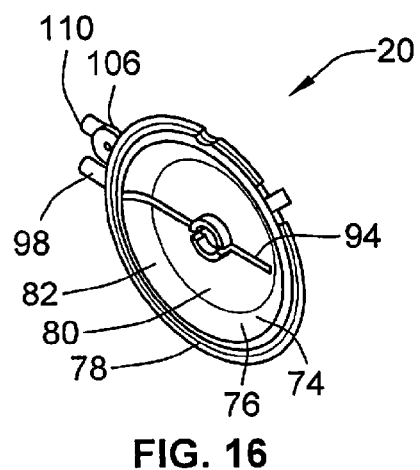
FIG. 15      FIG. 16

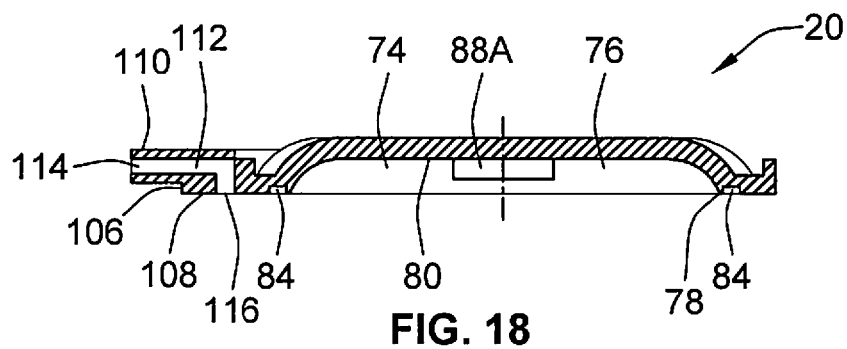
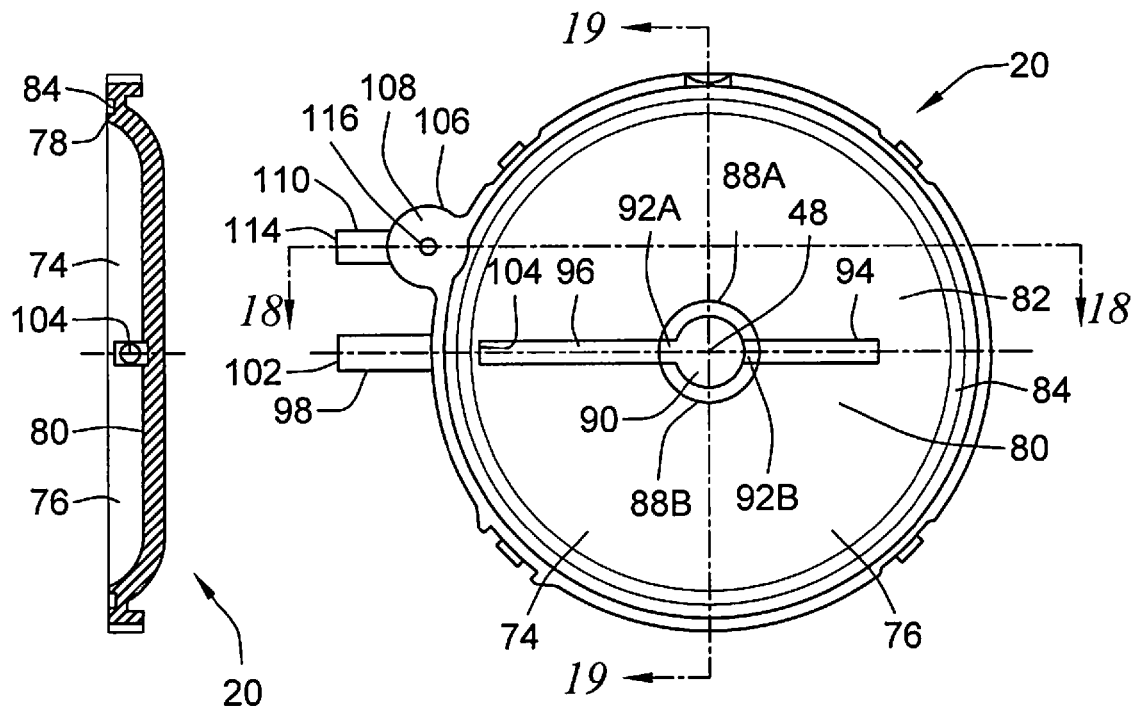
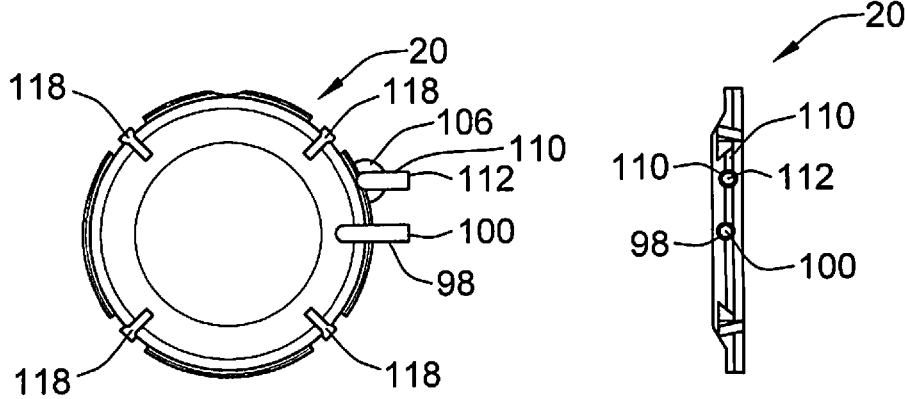

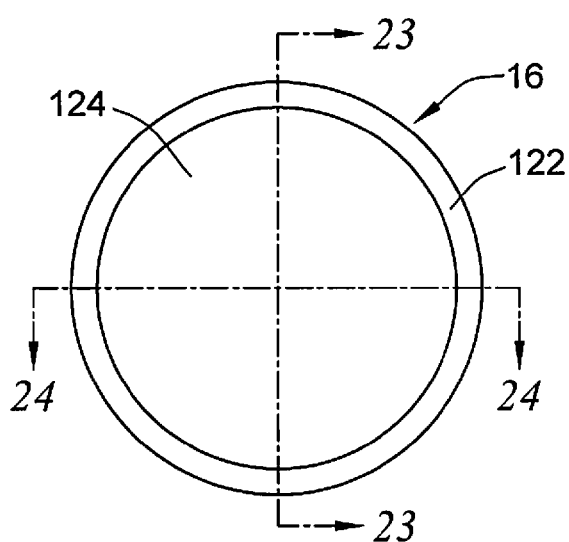
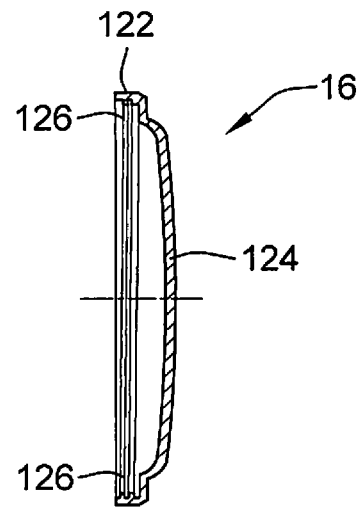
FIG. 22  FIG. 23
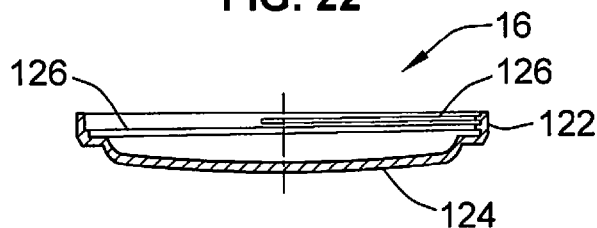
FIG. 24
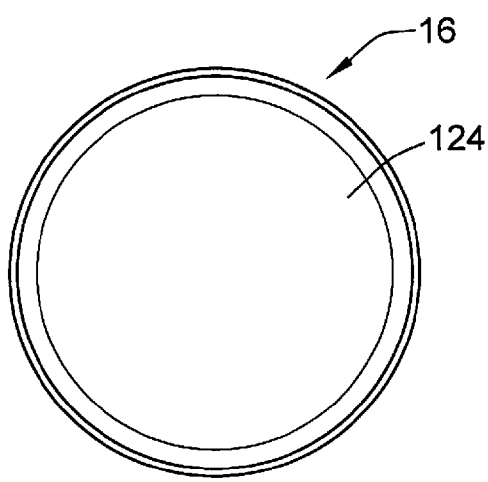
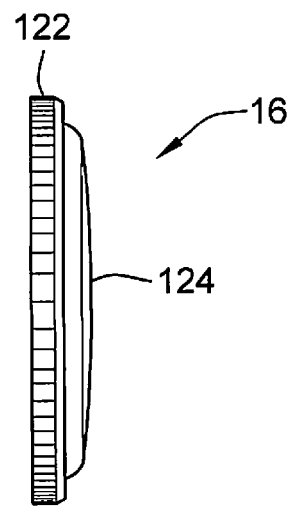
FIG. 25  FIG. 26

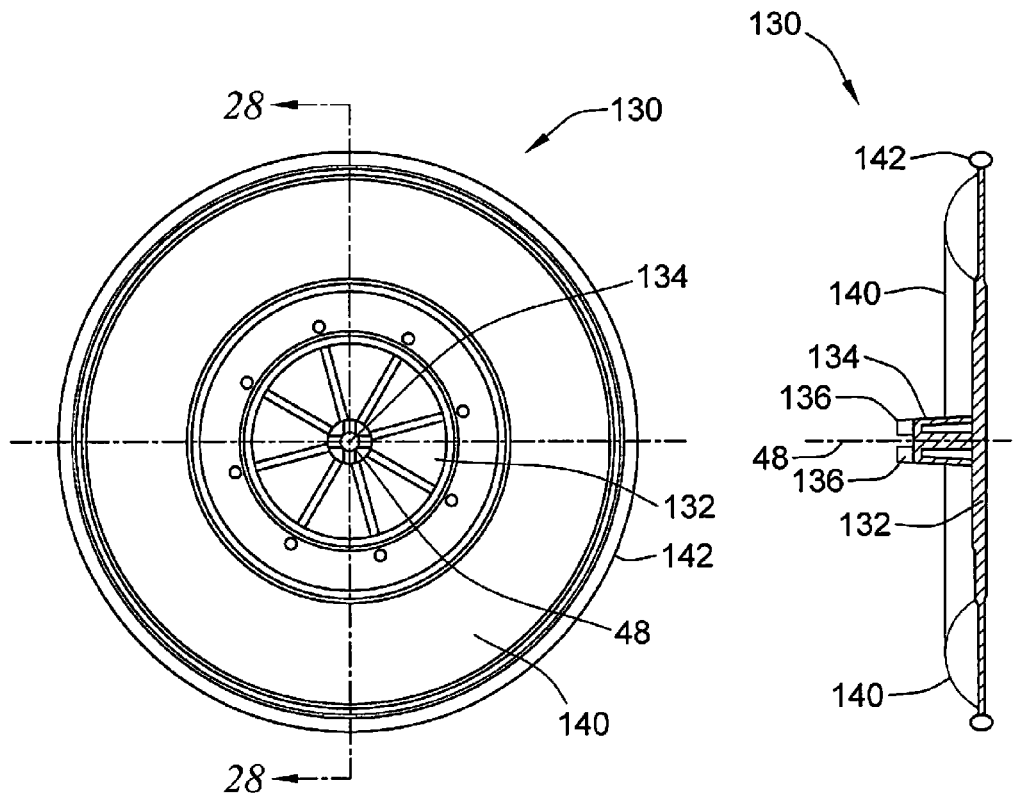
FIG. 27  FIG. 28
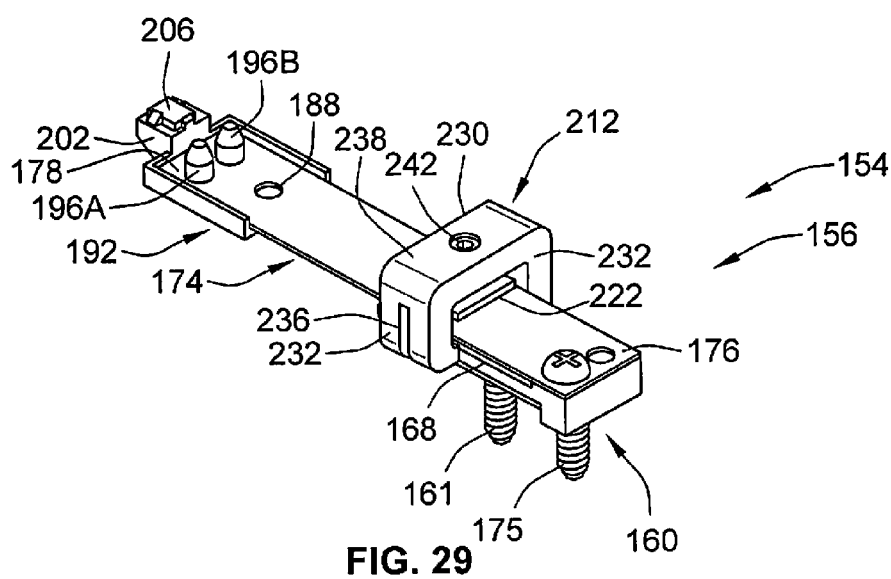
FIG. 29

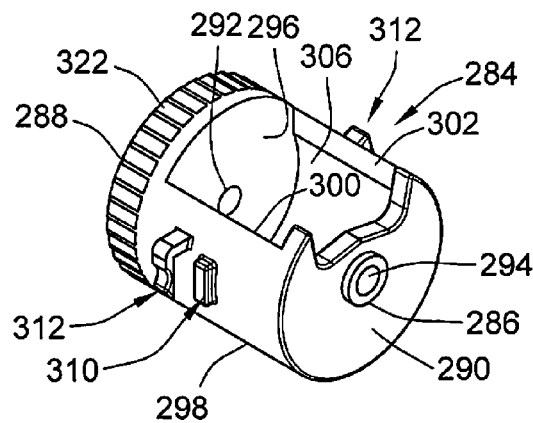
FIG. 38
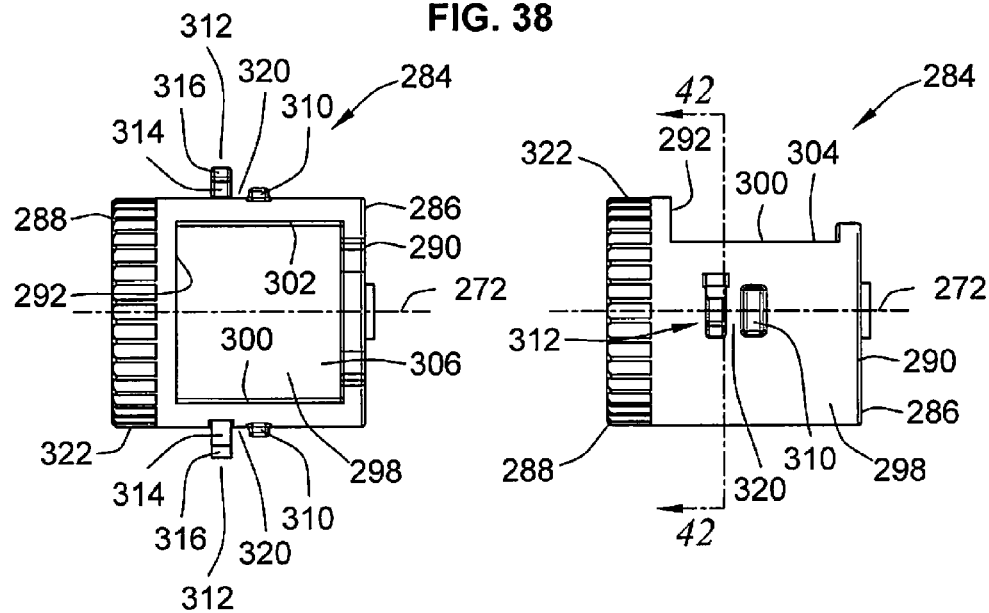
FIG. 39 FIG. 40
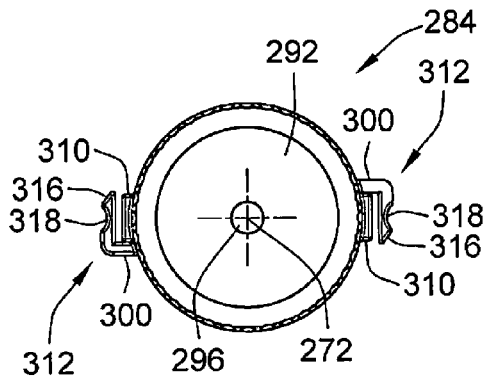 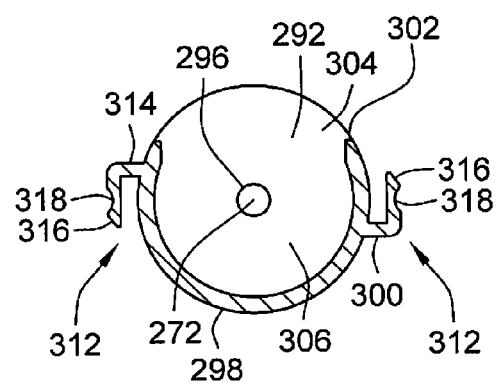
FIG. 41 FIG. 42

MOUNTING APPARATUS FOR A PRESSURE GAGE

RELATED APPLICATIONS

This application is a division of U.S. application Ser. No. 12/716,671, filed Mar. 3, 2010, which claims the benefit of U.S. Provisional Application No. 61/157,975, filed Mar. 6, 2009.

BACKGROUND

The present disclosure is directed to a pressure gage having a motion detection mechanism magnetically attached to a pressure sensing flexible diaphragm, the motion detection mechanism being magnetically coupled to a pointer rotation mechanism configured to indicate the position of the diaphragm and the corresponding pressure sensed by the diaphragm.

BRIEF DESCRIPTION OF THE DRAWING FIGURES

Figure 2:
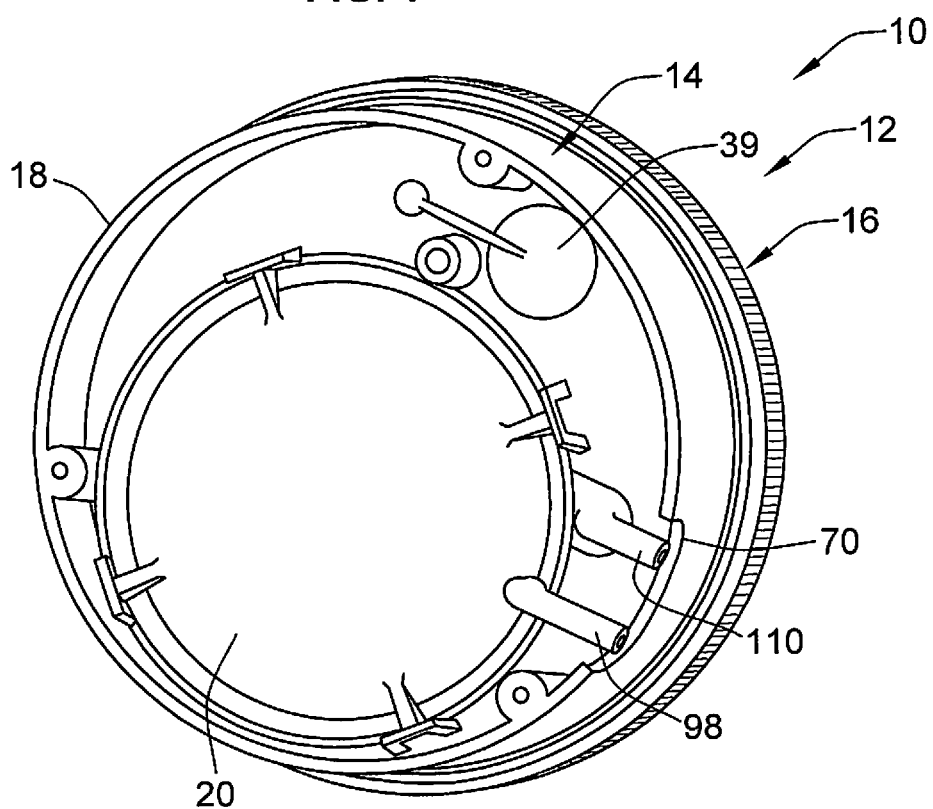
Figure 3:
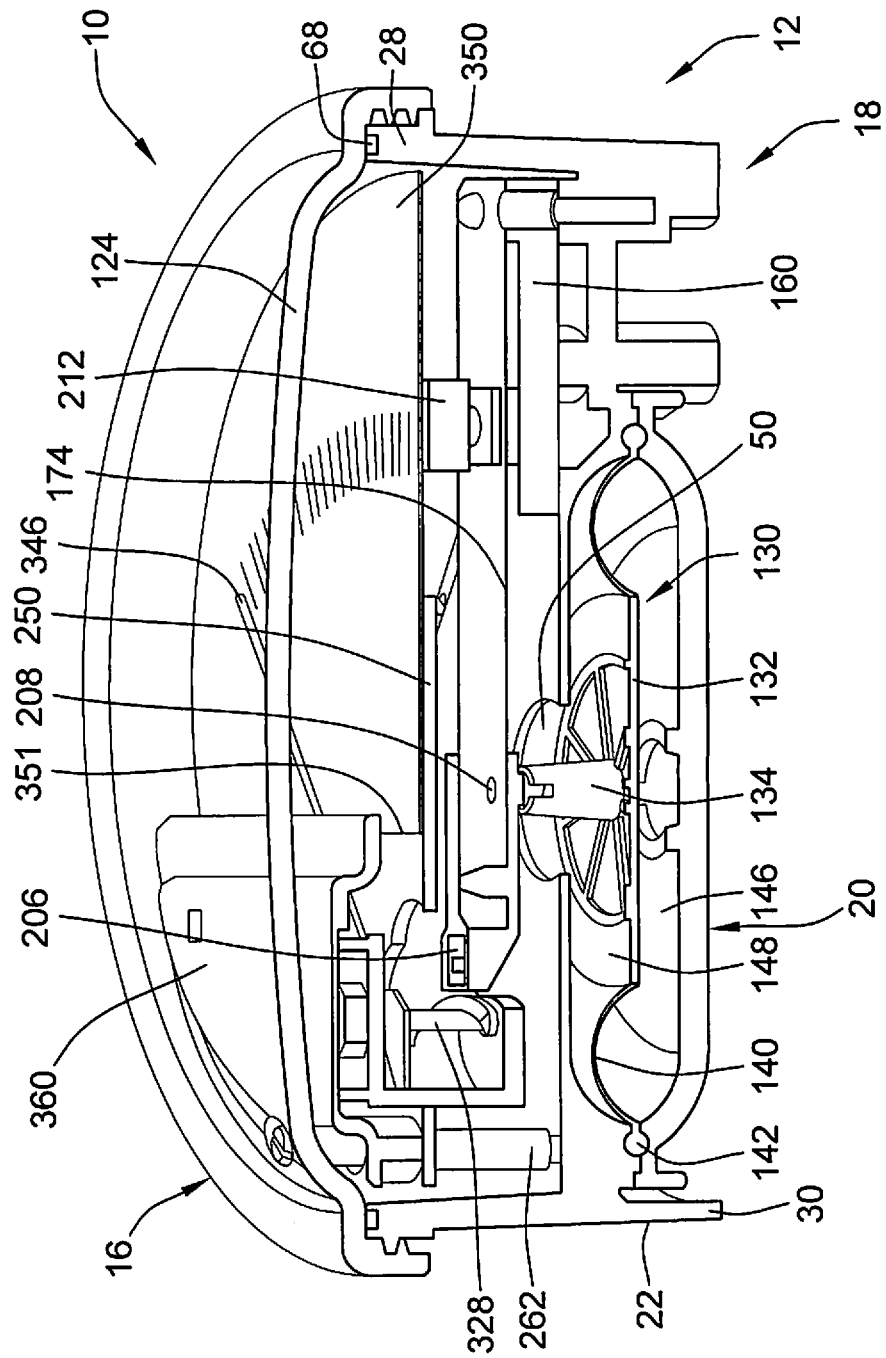
Figure 4:
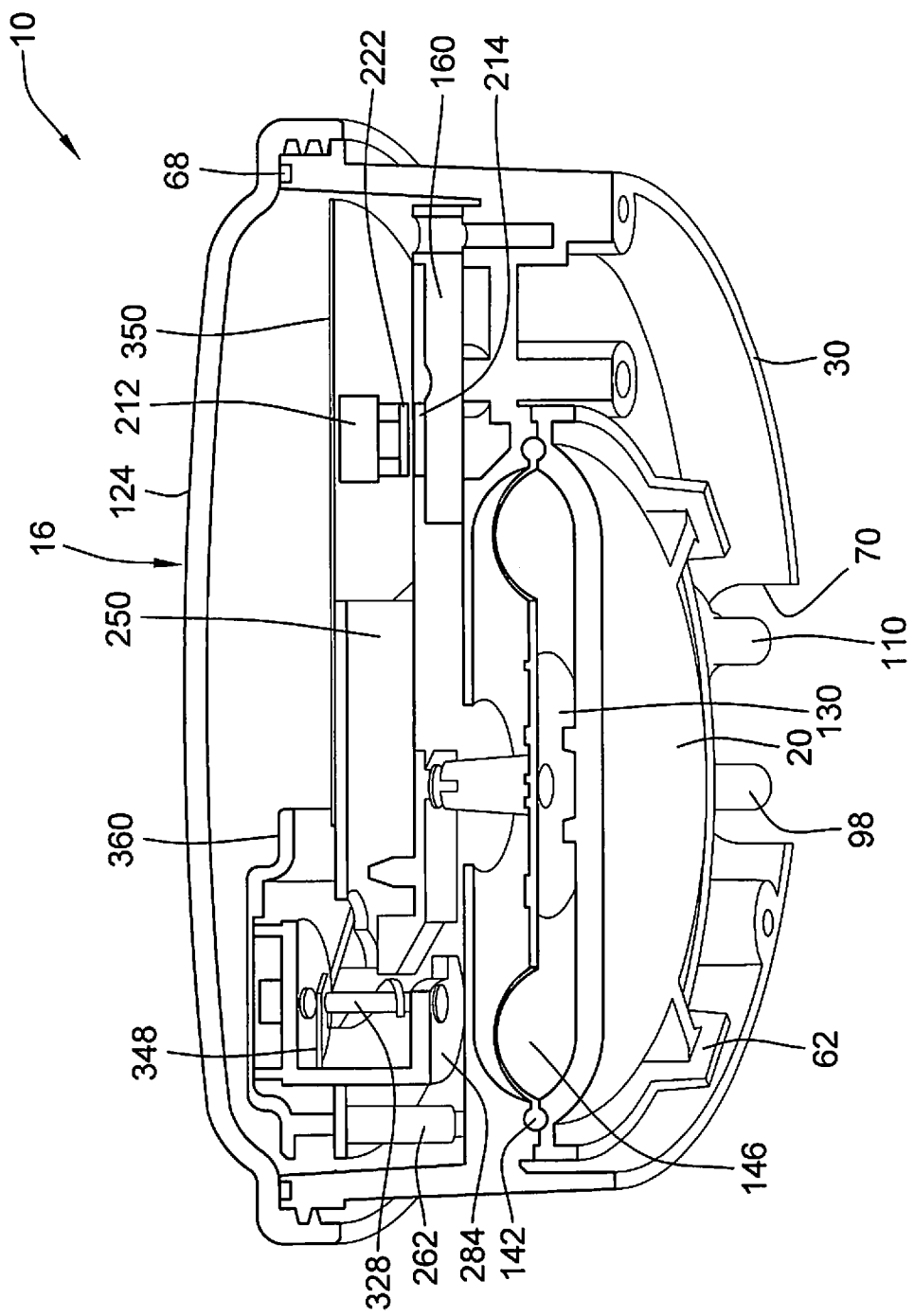
Figure 5:
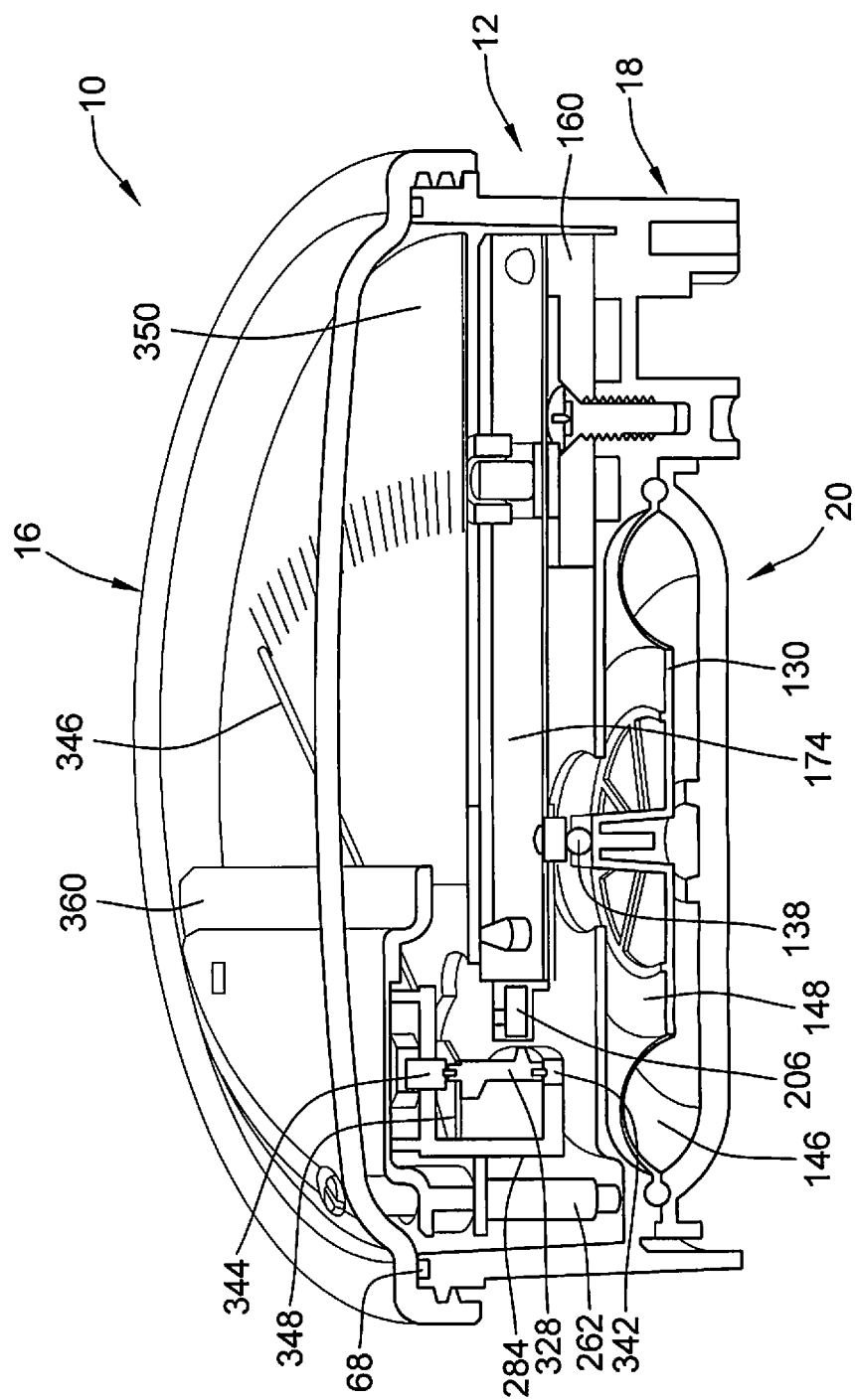
Figure 6:
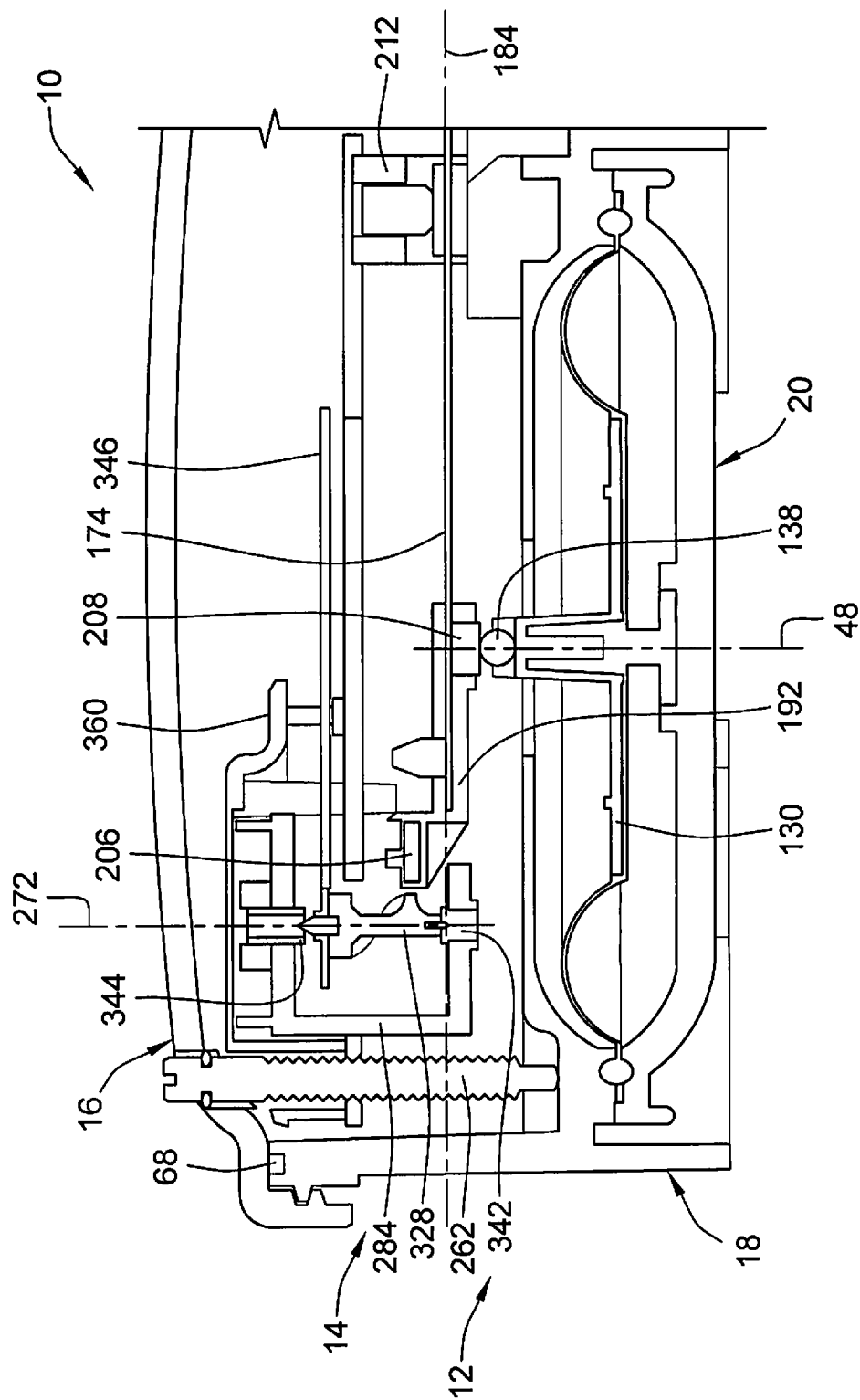
Figure 7:
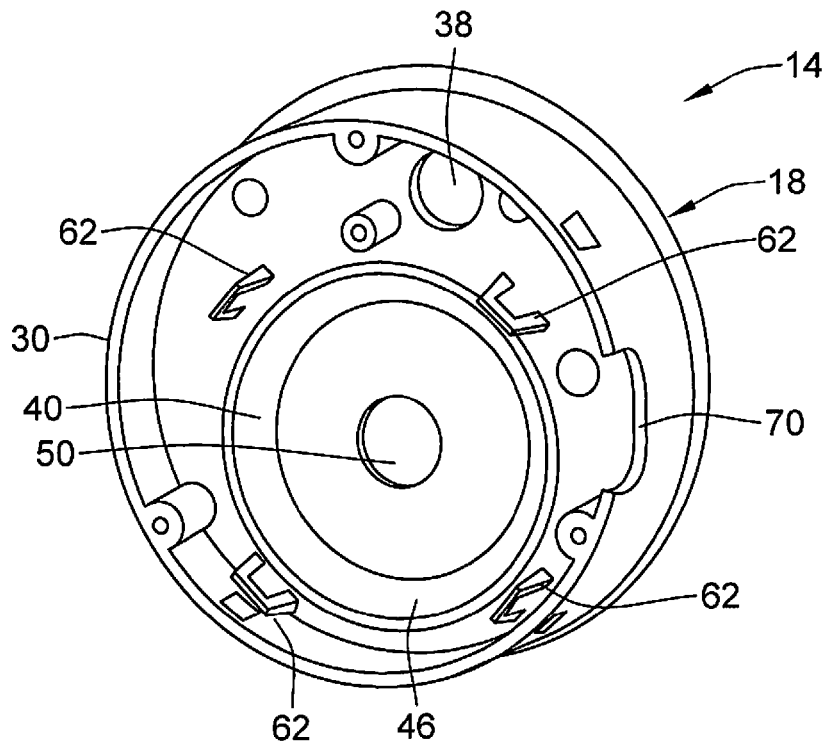
Figure 8:
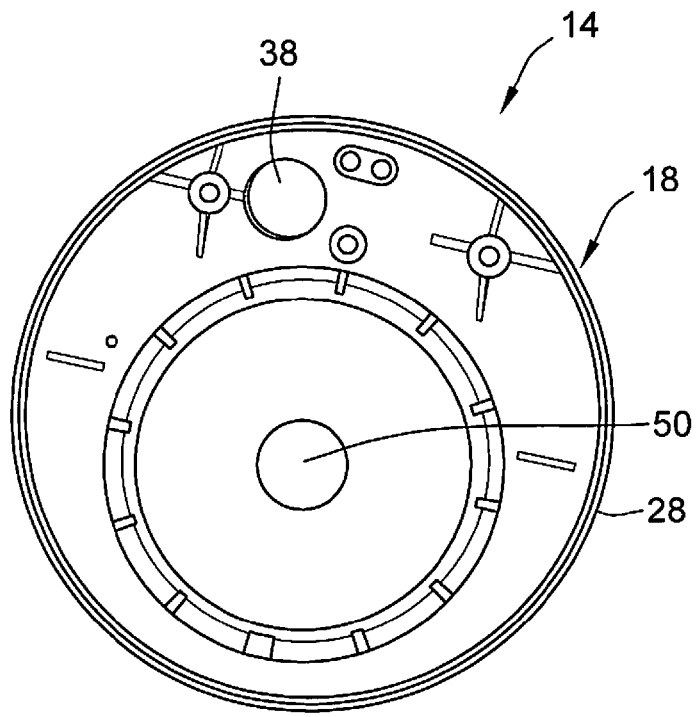
Figure 30:
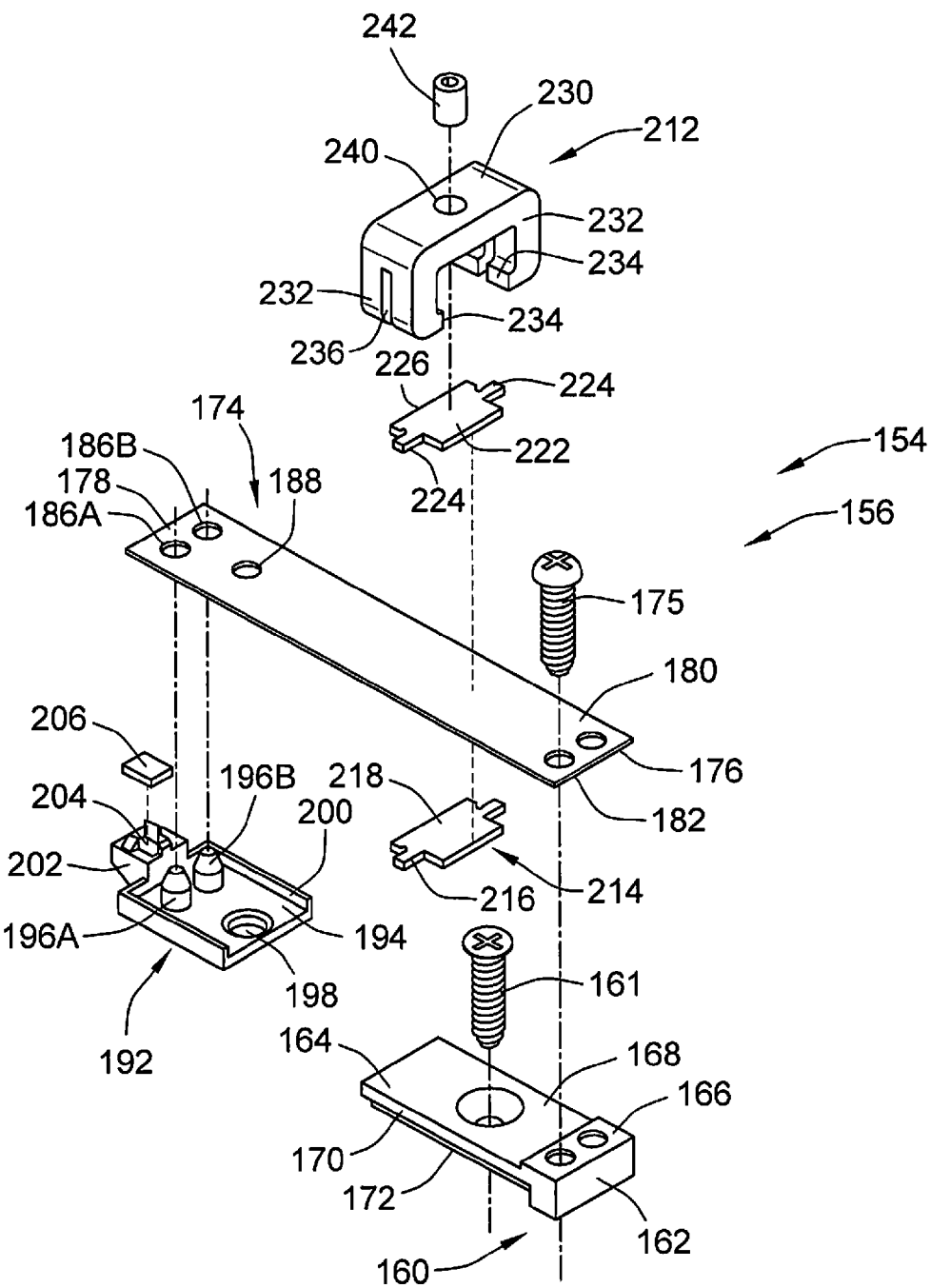
Figure 31:
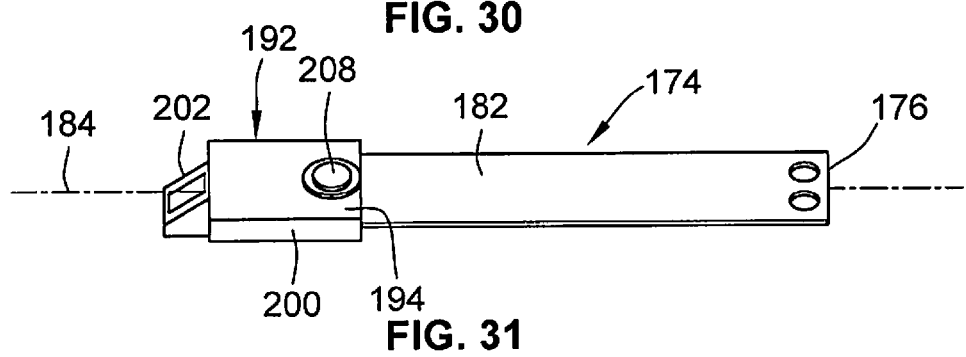
Figure 32:
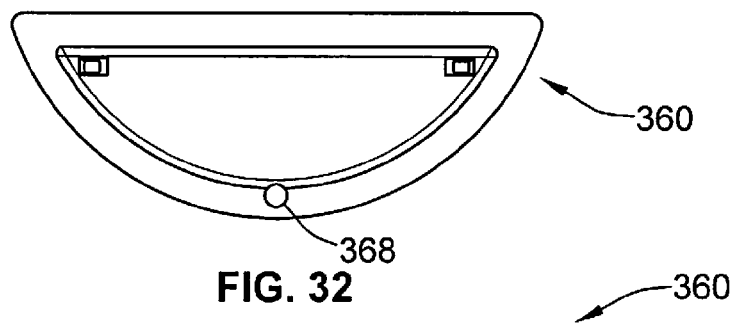
Figure 33:
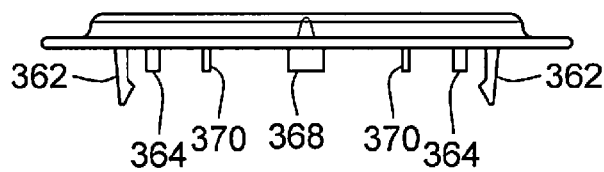
Figure 34:
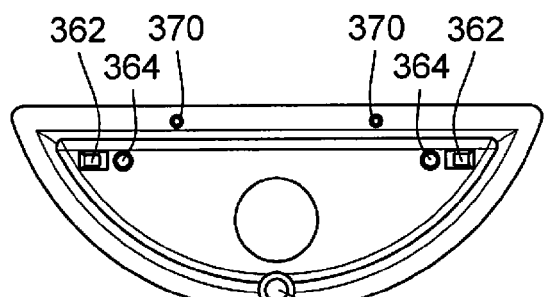
Figure 35:
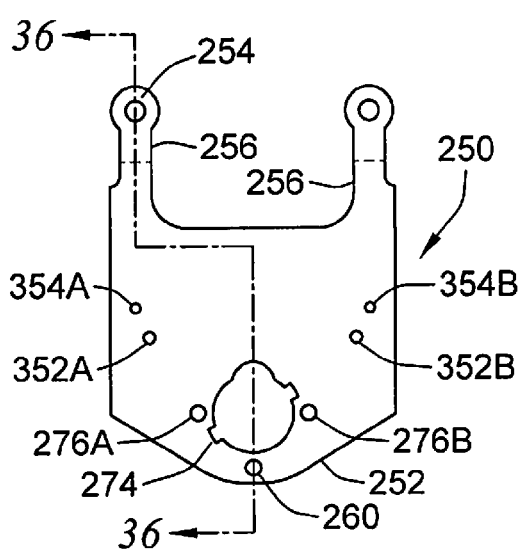
Figures 36, 37:
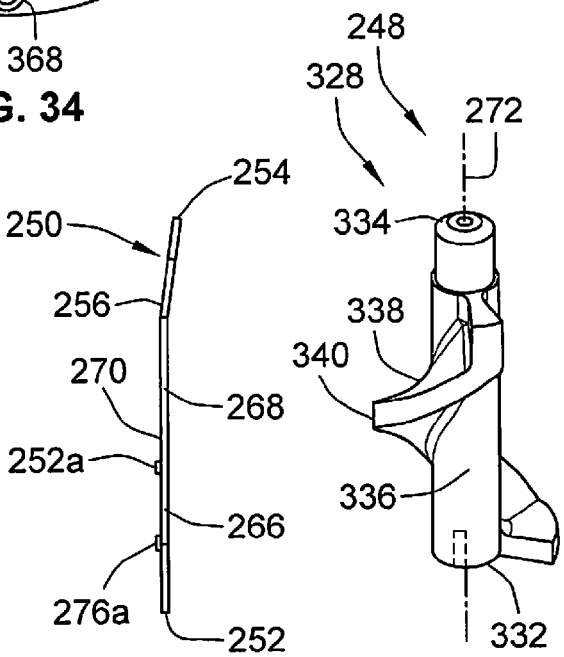
Figure 43:
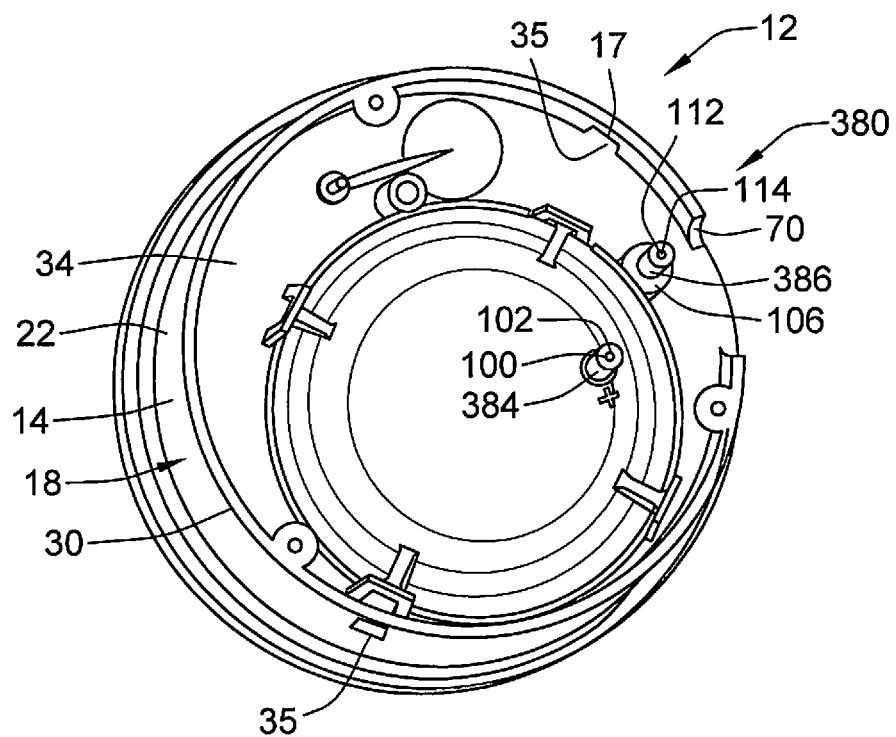
Figure 44:
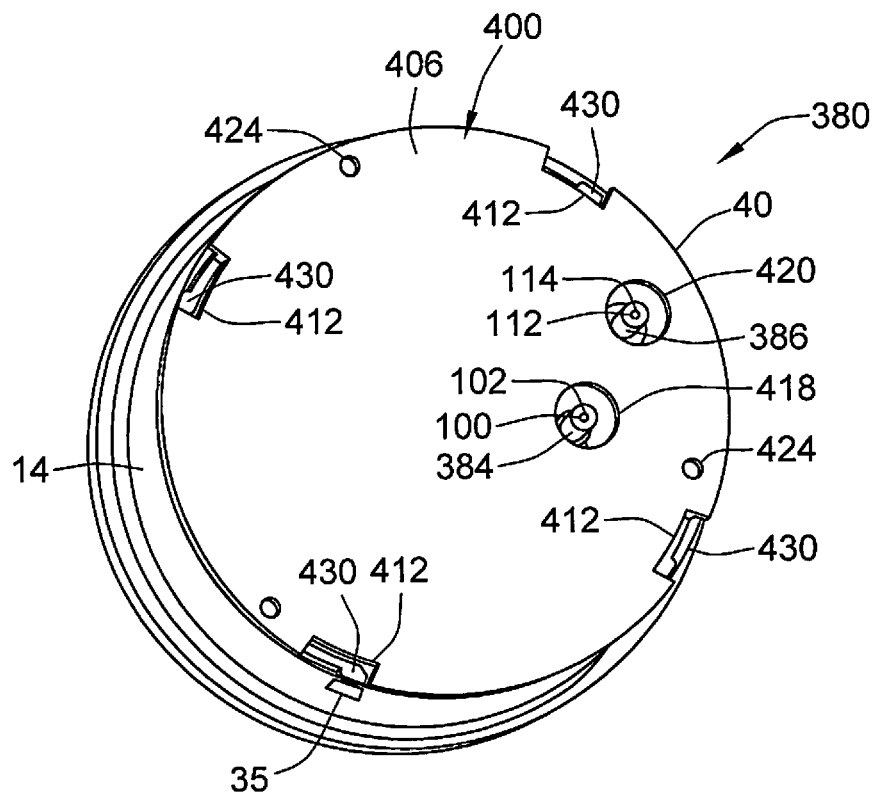
Figure 45:
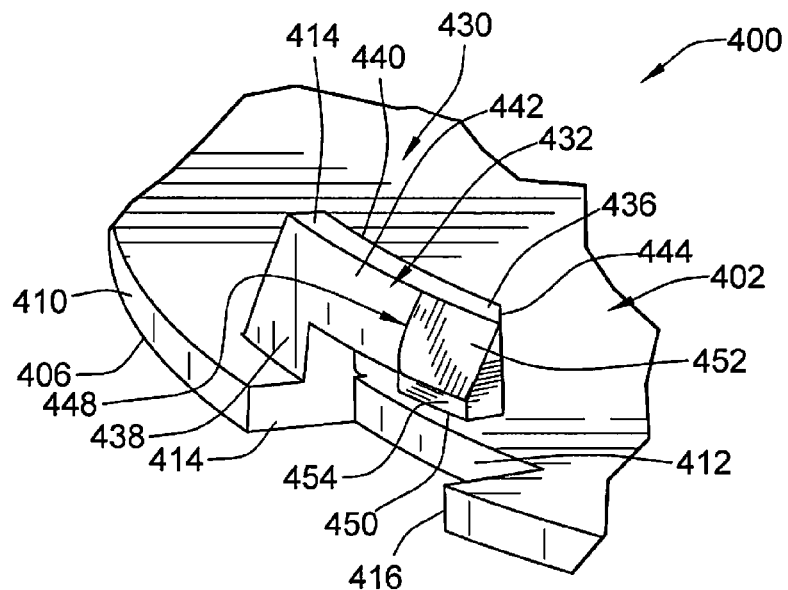
Figure 46:
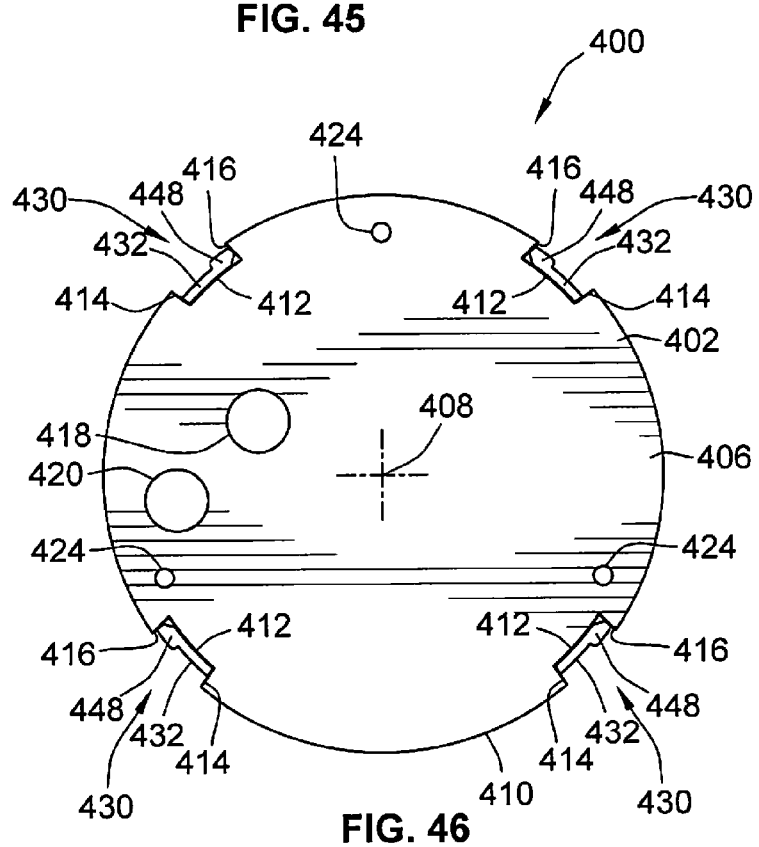
Figure 48:
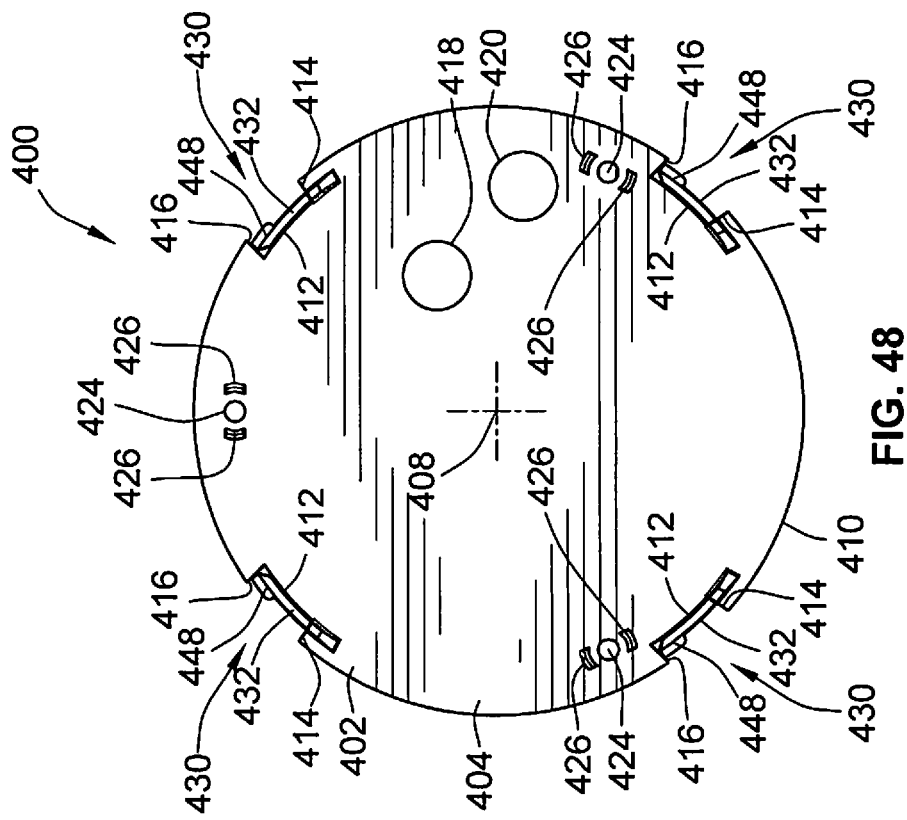
Figure 47:
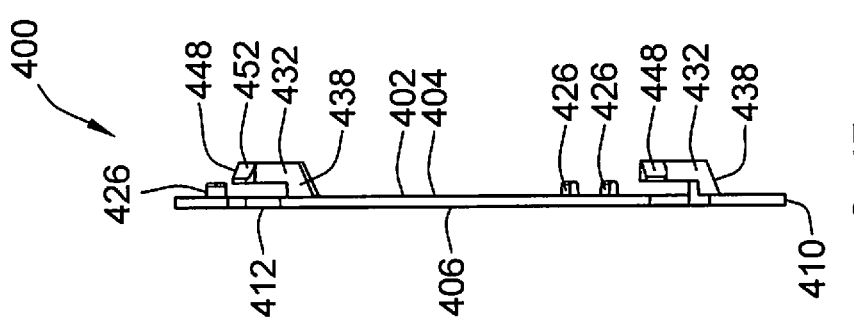

FIG. 1 is a front perspective view of a pressure gage of the present disclosure;
FIG. 2 is a rear perspective view of the gage;
FIG. 3 is a perspective cross sectional view of the gage;
FIG. 4 is a perspective cross sectional view of the gage;
FIG. 5 is a perspective cross sectional view of the gage;
FIG. 6 is a cross sectional side view of the gage;
FIG. 7 is a rear perspective view of the base member of the housing;
FIG. 8 is a front perspective view of the base member of the housing
FIG. 9 is a side elevational view of the base member of the housing;
FIG. 10 is front elevational view of the base member of the housing;
FIG. 11 is a bottom side view of the base member of the housing;
FIG. 12 is a rear elevational view of the base member of the housing;
FIG. 13 is a cross sectional view taken along line 13-13 of FIG. 10;
FIG. 14 is a cross sectional view taken along line 14-14 of FIG. 10;
FIG. 15 is a rear perspective view of the seal member of the housing;
FIG. 16 is a front perspective view of the seal member;
FIG. 17 is a front elevational view of the seal member;
FIG. 18 is a cross sectional view taken along 18-18 of FIG. 17;
FIG. 19 is a cross sectional view taken along line 19-19 of FIG. 17;
FIG. 20 is a rear elevational view of the seal member;
FIG. 21 is side view of the seal member;
FIG. 22 is a front elevational view of the cover;
FIG. 23 is a cross sectional view taken along line 23-23 of FIG. 22;
FIG. 24 is a cross sectional view taken along line 24-24 of FIG. 22;
FIG. 25 is a rear elevational view of the cover;
FIG. 26 is a side elevational view of the cover;
FIG. 27 is a front elevational view of the diaphragm;
FIG. 28 is a cross sectional view taken along line 28-28 of FIG. 27;
FIG. 29 is a perspective view of the motion detection mechanism;
FIG. 30 is an exploded view of the motion detection mechanism;
FIG. 31 is a perspective view of the beam and magnet mounting assembly of the motion detection mechanism;
FIG. 32 is a front elevational view of the cap;
FIG. 33 is a bottom view of the cap;
FIG. 34 is a rear elevational view of the cap;
FIG. 35 is a front elevational view of the mounting bracket;
FIG. 36 is a cross sectional view taken along line 36-36 of FIG. 35;
FIG. 37 is a perspective view of the helix;
FIG. 38 is a perspective view of the helix housing;
FIG. 39 is a top plan view of the helix housing;
FIG. 40 is a side elevational view of the helix housing;
FIG. 41 is a left end view of the helix housing;
FIG. 42 is a cross sectional view taken along line 42-42 of FIG. 40;
FIG. 43 is a rear perspective view of an alternate embodiment of the pressure gage of the present disclosure;
FIG. 44 is a rear perspective view of the pressure gage of FIG. 43 including a mounting apparatus;
FIG. 45 is an enlarged partial perspective view of a locking member of the mounting apparatus;
FIG. 46 is a rear elevational view of the mounting apparatus;
FIG. 47 is a side elevational view of the mounting apparatus; and
FIG. 48 is a front elevational view of the mounting apparatus.

DETAILED DESCRIPTION

A gage 10 according to the present disclosure is shown in FIGS. 1 and 2. Gage 10 may be a pressure gage adapted to sense and indicate a measured pressure, which may be a differential in pressure between the pressure of a first fluid and the pressure of a second fluid. Gage 10 includes an enclosure 12 having a housing 14, a cover 16 removably coupled to housing 14, and a generally linear central axis 32.

Housing 14, as shown in FIGS. 7-21, includes a base member 18 and a seal member 20 removably coupled to base member 18. Base member 18 includes a generally cylindrical peripheral side wall 22 extending from a first end 24 to a second end 26. Side wall 22 includes a generally circular peripheral first rim 28 at first end 24 and a generally circular peripheral second rim 30 at second end 26. Side wall 22 and first and second rims 28 and 30 are located generally concentrically about axis 32. Base member 18 includes an end wall 34 located within side wall 22 adjacent to, but spaced inwardly from, second end 26. End wall 34 is generally perpendicular to axis 32. End wall 34 is connected along a generally circular peripheral edge to the interior surface of side wall 22. Base member 18 includes a front chamber 36 located within side wall 22 between first end 24 and end wall 34. End wall 34 includes a generally circular pressure relief port 38 in communication with front chamber 36. A pressure relief plug 39 is removably located in pressure relief port 38 to seal port 38. First rim 28 forms a first opening 29, and second rim 30 forms a second opening 31. Side wall 22 includes a plurality of mounting apertures 35, for example four mounting apertures 35, spaced generally uniformly apart from one another about axis 32. Each mounting aperture 35 is located between end wall 34 and second rim 30. Each mounting aperture 35 includes a generally linear proximal edge located adjacent end wall 34, a generally linear distal edge 37 spaced apart from and generally parallel to end wall 34, and a pair of spaced apart generally linear side edges that extend between the proximal edge and distal edge 37. The side edges are inclined toward one another as they extend toward distal edge 37.

End wall 34 includes a recess 40 having a generally circular peripheral edge 42 and a bottom wall 44. Bottom wall 44 includes a centrally located generally planar portion and an annular side wall portion that extends around the planar portion. The side wall portion of bottom wall 44 extends from the planar portion to edge 42 in a generally concavely curved manner in the form of an arc of a circle. Recess 40 forms a rear chamber 46 on the opposite side of end wall 34 from front chamber 36. Edge 42 forms an opening in communication with rear chamber 46. Edge 42 is generally concentrically located about a linear axis 48 that is parallel to and spaced apart from axis 32. Bottom wall 44 includes a generally circular port 50 located generally concentrically about axis 48. Port 50 is in fluid communication with front chamber 36 and rear chamber 46 and places front chamber 36 and rear chamber 46 in fluid communication with one another. A generally circular groove 52 is located in the exterior surface of end wall 34 and extends generally concentrically about axis 48 and edge 42 of recess 40. End wall 34 also includes a generally circular port 56 in fluid communication with front chamber 36. Port 56 is located radially outwardly from recess 40 and edge 42 with respect to axis 48. An annular groove 58 extends concentrically about port 56 in the outer surface of end wall 34 and is configured to receive a resilient elastomeric gasket 60, such as an O-ring. A plurality of connector members 62 are attached to the exterior surface of end wall 34 and are spaced generally uniformly about axis 48 and radially outwardly from edge 42 of recess 40. Each connector member 62 comprises a generally U-shaped stirrup extending outwardly from and generally perpendicular to end wall 34. First rim 28 of side wall 22 includes a generally circular groove 66 configured to receive a resilient elastomeric gasket 68, such an O-ring. First end 24 of side wall 22 is externally threaded. Second end 26 of side wall 22 includes a notch 70 adjacent port 56. Base member 18 may be formed from a plastic material.

Seal member 20 of housing 14, as shown in FIGS. 15-21, includes an inner surface having a recess 74 forming an external chamber 76. Recess 74 includes a generally circular peripheral edge 78, a generally planar bottom wall 80 and a curved side wall 82 that extends between bottom wall 80 and edge 78. A generally circular annular groove 84 extends generally concentrically about edge 78 of recess 74 and about axis 48. Generally C-shaped members 88A and 88B extend outwardly from the inner surface of seal member 20 and are arranged with respect to one another in a generally circular and annular manner generally concentrically about axis 48. A chamber 90 is formed between C-shaped members 88A-B. Gaps 92A-B are formed between respective ends of C-shaped members 88A-B and are in communication with chamber 90. A groove 94 formed in the interior surface of recess 74 extends generally linearly outwardly from gap 92B to a distal end spaced apart from side wall 82. A groove 96 is formed in the interior surface of recess 74 that extends generally linearly from gap 92A to side wall 82. Grooves 94 and 96 are located in alignment with one another and extend generally radially outwardly with respect to axis 48.

Seal member 20 includes a first fluid conduit 98. First fluid conduit 98 includes a first fluid passageway 100 having a first port 102 formed in the distal end of first fluid conduit 98 and a second port 104 formed in side wall 82 of recess 74. Second port 104 of first fluid passageway 100 is in fluid communication with external chamber 76 of recess 74 and groove 96. An ear 106 is attached to the circular peripheral edge of seal member 20. Ear 106 includes a generally planar inner surface 108. A second fluid conduit 110 is connected to ear 106. Second fluid conduit 110 includes a second fluid passageway 112 having a first port 114 at the distal end of second fluid conduit 110 and a second port 116 formed generally concentrically within inner surface 108 of ear 106. A plurality of posts 118 are attached to the exterior surface of seal member 20 and extend outwardly therefrom. Posts 118 are generally uniformly spaced about axis 48. Each post 118 is configured to be releasably engaged by a connector member 62 of base member 18 to releasably couple seal member 20 to base member 18. Seal member 20 may be formed from a plastic material.

As shown in FIGS. 22-26, cover 16 includes a ribbed generally circular peripheral rim 122 that surrounds a clear lens 124. Rim 122 is internally threaded and is configured to be threadably engaged to first end 24 of base member 18. Rim 122 includes a generally circular and annular planar surface 126 that is configured to engage gasket 68 when cover 16 is coupled to base member 18. Gasket 68 thereby creates a fluid tight seal between first end 24 of base member 18 and cover 16. Cover 16 is selectively removable and replaceable on base member 18. Cover 16 may be formed from a plastic material.

Gage 10 includes a flexible diaphragm 130. Diaphragm 130 includes a rigid generally disc-shaped circular diaphragm plate 132 concentrically located about axis 48 and generally perpendicular to axis 48. A post 134 extends outwardly and generally perpendicular to the inner surface of plate 132 along axis 48. The proximal end of post 134 is coupled to plate 132. The distal end of post 134 includes a plurality of finger-like gripping members 136. A connector member 138 is coupled to the distal end of post 134 by gripping members 136. Connector member 138 has a curved surface such as a curved spherical surface of a ball or sphere. Connector member 138 may be formed as a spherical ball and may be formed from a metal material that is ferromagnetic. Diaphragm 130 also includes a generally annular resilient and flexible diaphragm member 140 extending around diaphragm plate 132. Diaphragm member 140 includes an inner generally circular edge coupled to the outer circular edge of diaphragm plate 132. Diaphragm member 140 includes a circumferential circular rim 142 having a generally oval-shaped cross-section. As shown in FIG. 28, diaphragm member 140 is curved between the inner rim and outer rim 142 of diaphragm member 140 in the general shape of an arc of a circle such that diaphragm member 140 has an annular inner convexly curved surface and an annular outer concavely curved surface.

Diaphragm 130 is coupled to base member 18 by seal member 20. Rim 142 of diaphragm member 140 is located within groove 52 of base member 18 with post 134 extending from rear chamber 46 through port 50 in bottom wall 44 of recess 40 and into front chamber 36 of base member 18. Connector member 138 of diaphragm 130 is thereby located in front chamber 36. Rim 142 of diaphragm member 140 is also located within groove 84 of seal member 20 when seal member 20 is coupled to base member 18 by connector member 62. Rim 142 creates a fluid tight seal between groove 52 and groove 84 and between base member 18 and seal member 20. Gasket 60 engages inner surface 108 of ear 106 to create a fluid tight seal between ear 106 and base member 18. Second port 116 of second fluid passageway 112 is in fluid communication with port 56 in base member 18 and is thereby in fluid communication with front chamber 36 of base member 18. Gage 10 includes a first fluid chamber 146 comprising external chamber 76 of seal member 20, and a second fluid chamber 148 comprising front chamber 36 and rear chamber 46 of base member 18. First fluid chamber 146 and second fluid chamber 148 are sealed fluid tight from one another by diaphragm 130. First fluid chamber 146 is in fluid communication with first fluid passageway 100 of first fluid conduit 98 and first port 102. Second fluid chamber 148 is in fluid communication with second fluid passageway 112 of second fluid conduit 110 and first port 114.

Each fluid chamber 146 and 148 may be placed in fluid communication with a respective source of fluid. If desired, one fluid chamber may be placed in fluid communication with the atmosphere. First fluid chamber 146 is separated from and is sealed fluid-tight from second fluid chamber 148. Plate 132, post 134 and connector member 138 move along axis 48 in response to a differential in pressure between the pressure of the fluid in the first fluid chamber 146 from the pressure of the fluid in the second fluid chamber 148. C-shaped members 88A-B are configured to space diaphragm plate 132 from the interior surface of recess 74.

Gage 10 includes a motion transmitting mechanism 154 including a motion detection mechanism 156. Motion detection mechanism 156, as shown in FIGS. 29-31, includes a mounting base 160 coupled to end wall 34 of base member 18 by a fastener 161 within front chamber 36. Mounting base 160 extends between a first end 162 and a second end 164. Mounting base 160 includes a generally planar raised surface 166 at first end 162 and a generally planar recessed surface 168 that extends from a location adjacent raised surface 166 to second end 164 of mounting base 160. Raised surface 166 is generally parallel to recessed surface 168. Mounting base 160 also includes outwardly extending flanges 170 that respectively extend along side edges of recessed surface 168. Each flange 170 includes a generally planar bottom surface 172 that is generally parallel to recessed surface 168. Bottom surface 172 extends from second end 164 toward first end 162 of mounting base 160.

A resiliently flexible and bendable cantilevered beam 174 is coupled to mounting base 160 by a fastener 175 and to end wall 34 of base member 18. Beam 174 includes a first end 176 and a second end 178. First end 176 is coupled to raised surface 166 of mounting base 160. Beam 174 extends from first end 176 and raised surface 166 toward second end 178 generally parallel to and spaced apart from recessed surface 168 when beam 174 is in an unbiased condition. Beam 174 may be in the form of a plate or leaf spring having a generally planar top surface 180 and a generally planar bottom surface 182 that is generally parallel to top surface 180. Beam 174 is resiliently flexible along its longitudinal axis 184 and may be formed from metal or other materials. The length, width and thickness of beam 174 may be selected as desired to provide beam 174 with a desired spring rate. Second end 178 of beam 174 includes transversely spaced apart apertures 186A-B. Second end 178 of beam 174 also includes an aperture 188 located inwardly from second end 178 and apertures 186A-B. Aperture 188 is located generally centrally between side edges of beam 174.

A holder 192 is coupled to second end 178 of beam 174. Holder 192 includes a generally planar base plate 194. A pair of transversely spaced apart locating members 196A-B extend upwardly from a generally planar top surface of base plate 194. Locating member 196A extends through aperture 186A and locating member 196B extends through aperture 186B of beam 174 such that the top surface of base plate 194 is located adjacent bottom surface 182 of beam 174. Base plate 194 includes an aperture 198 aligned with aperture 188 in beam 174. A three-sided wall 200 extends upwardly from base plate 194 along opposing side edges of beam 174 and along a distal edge of beam 174 at second end 178. Holder 192 includes a receptacle 202 located adjacent to and outwardly from second end 178 of beam 174. Receptacle 202 includes a pocket 204 having an open distal end configured to receive a drive magnet 206. An attachment magnet 208 is located within aperture 198 of holder 192 and is coupled to surface 182 of beam 174. Attachment magnet 208 is spaced apart from drive magnet 206 along axis 184. Attachment magnet 208 is configured to be magnetically attached in direct contact and engagement with connector member 138 of diaphragm 130. Attachment magnet 208 magnetically attaches connector member 138, post 134 and plate 132 of diaphragm 130 to second end 178 of beam 174 such that movement of plate 132 of diaphragm 130 along axis 48 in response to a pressure differential between first fluid chamber 146 and second fluid chamber 148 provides a corresponding movement of second end 178 of beam 174 and of drive magnet 206 by resiliently bending beam 174 along axis 184.

Motion detection mechanism 156 also includes a spring rate adjustment mechanism 212. Spring rate adjustment mechanism 212 includes a bottom adjustment member 214 located between recessed surface 168 of mounting base 160 and bottom surface 182 of beam 174. Bottom adjustment member 214 is in the general form of a planar plate including a generally planar bottom surface in engagement with recessed surface 168 and a generally planar top surface in engagement with bottom surface 182 of beam 174. Bottom adjustment member 214 includes a pair of fingers 216 respectively extending outwardly and transversely from each side of bottom adjustment member 214. Bottom adjustment member 214 also includes a generally linear distal edge 218 extending transversely to axis 184. Spring rate adjustment mechanism 212 also includes a top adjustment member 222 constructed in substantially the identical manner as bottom adjustment member 214. Top adjustment member 222 is formed in the general form of a generally planar plate and includes a generally planar bottom surface in engagement with top surface 180 of beam 174. Top adjustment member 222 includes a finger 224 extending transversely and outwardly from each side of top adjustment mechanism member 222 with respect to axis 184. Top adjustment member 222 includes a generally linear distal edge 226 that extends transversely to axis 184 and generally parallel to distal edge 218 of bottom adjustment member 214. Top adjustment member 222 and bottom adjustment member 214 are located on opposite sides of beam 174 and are located in alignment with one another.

Spring rate adjustment mechanism 212 also includes a generally U-shaped clamping member 230 having a pair of spaced apart and generally parallel downwardly extending legs 232. Each leg 232 includes an inwardly extending lip 234 at the distal end of each leg 232. Each leg 232 also includes an upwardly extending slot 236 that extends through lip 234 and leg 232. Bottom adjustment member 214 and top adjustment member 222 extend between legs 232 of clamping member 230 with fingers 216 and 224 located within respective slots 236 of legs 232. Fingers 216 and 224 couple bottom adjustment member 214 and top adjustment member 222 to clamping member 230 while allowing bottom adjustment member 214 and top adjustment member 222 to move along slots 236 with respect to clamping member 230. Lips 234 of legs 232 are located below flanges 170 of mounting base 160 and are adapted to engage bottom surfaces 172 of flanges 170. A cross member 238 having a threaded bore 240 extends between the distal ends of legs 232. A threaded fastener 242, such a set screw, is located in bore 240 and is threadably coupled to cross member 238.

When fastener 242 is in a retracted released position, clamping member 230 and bottom and top adjustment members 214 and 222 may be selectively slid along axis 184 to place distal edges 218 and 226 a selected distance from second end 178 of beam 174. Beam 174 extends in a cantilevered manner outwardly from distal edges 218 and 226. The effective bending length of beam 174 between distal edges 218 and 226 and second end 178, and thereby the spring rate of beam 174, may be selectively varied by the positioning of the distal edges 218 and 226 with respect to beam 174. When fastener 242 is moved to an extended tightened position, fastener 242 will press top adjustment member 222 into engagement with top surface 180 of beam 174 and will press lips 234 of legs 232 into engagement with bottom surfaces 172 of flanges 170 of mounting base 160, such that top adjustment member 222, bottom adjustment member 214, and the portion of beam 174 between top and bottom adjustment members 214 and 222, are pressed into locked engagement with recessed surface 168 of mounting base 160.

Motion transmitting mechanism 154 also includes a pointer rotation mechanism 248. Pointer rotation mechanism 248 includes a generally U-shaped bracket 250 having a first end 252 and a second end 254 located in front chamber 36 of base member 18. Bracket 250 is generally formed as a bent plate. Bracket 250 includes a pair of spaced apart legs 256 at second end 254 that are coupled to mounting members 258 of base member 18. Bracket 250 includes an aperture 260 at first end 252 adapted to threadably receive a threaded zero set screw 262. Zero set screw 262 includes a top end having a slot adapted to receive the tip of a tool such as flat blade screwdriver and a bottom end having a generally cylindrical shaft adapted to be received in a pocket 264 in end wall 34 of base member 18. Zero set screw 262 is adapted to extend into a bore in cover 16 such that the top end of zero set screw 262 is accessible from the exterior of gage 10. A resilient seal member such as an O-ring extends around zero set screw 262 within the bore of cover 16 to create a fluid-tight seal between zero set screw 262 and cover 16. Zero set screw 262 may be manually rotated in a desired direction about its longitudinal axis with respect to bracket 250 to either raise or lower first end 252 with respect to second end 254. Bracket 250 includes a generally circular opening 266 adjacent first end 252 that extends between a bottom surface 268 and a top surface 270 of bracket 250. Opening 266 includes a central axis 272 and two generally rectangular slots 274 diametrically opposed to one another on opposite sides of axis 272. Axis 272 is generally parallel to and spaced apart from axis 48. Axis 184 of beam 174 intersects axis 272 and axis 184 is generally perpendicular to axis 272 when beam 174 is in an unbiased condition. Bracket 250 includes outwardly extending projections 276A and 276B extending outwardly from top surface 270 that are located on opposite sides of opening 266. Projections 276A-B are diametrically opposed with respect to axis 272.

Pointer rotation mechanism 248 also includes a generally cylindrical housing 284 having a first end 286 and second end 288. First end 286 includes a circular first end wall 290 spaced apart from and generally parallel to a circular second end wall 292. First end wall 290 includes an aperture 294 located concentrically on axis 272. Second end wall 292 includes an aperture 296 aligned with aperture 294 along axis 272. A generally cylindrically curved side wall 298 extends between first end wall 290 and second end wall 292 and generally concentrically about axis 272 between a first side edge 300 and a second side edge 302.

Housing 284 includes an opening 304 between first and second side edges 300 and 302 that is in communication with a chamber 306 formed between first and second end walls 290 and 292 and side wall 298. Housing 284 includes a pair of generally rectangular stop members 310 attached to an outer surface of side wall 298. Stop members 310 are respectively located adjacent first and second side edges 300 and 302 and are diametrically opposed to one another with respect to axis 272. Stop members 310 are located approximately midway between first and second end walls 290 and 292. Stop members 310 are configured to respectively fit within slots 274 of opening 266 in bracket 250. Side wall 298 is configured to fit closely within opening 266. Housing 284 also includes a pair of resilient clip members 312. Each clip member 312 includes an outwardly extending arm 314 and a resiliently flexible finger 316 attached to a distal end of arm 314 and that extends transversely to arm 314 in a cantilevered manner. Each finger 316 includes an outer detent 318. As shown in FIGS. 41 and 42, fingers 316 are located on opposite sides of side wall 298 and extend from their respective arms 314 in opposite directions with respect to one another. Each clip member 312 is spaced apart from a respective stop member 310 along axis 272 in a direction toward second end wall 292 such that a gap 320 is formed between each associated stop member 310 and clip member 312 which is adapted to receive bracket 250. Side wall 298 includes a projecting ribbed portion 322 that extends outwardly beyond second end wall 292. Housing 284 may be formed from a plastic material.

Pointer rotation mechanism 248 also includes a helix 328, as shown in FIG. 37, having a first end 332 and a second end 334. Helix 328 includes a shaft 336 extending between first end 332 and second end 334 along axis 272. Helix 328 also includes a helical flange 338 that extends in a helical manner about shaft 336 and axis 272. Helical flange 338 includes a helical edge 340. Helix 328 is formed from a ferromagnetic metal material. Helix 328 is located within chamber 306 of housing 284 with first end 332 of shaft 336 rotationally coupled to first end wall 290 of housing 284 by a bearing 342 and second end 334 of shaft 336 rotationally coupled to second wall 292 of housing 284 by a bearing 344. A first pin couples first end 332 of shaft 336 to bearing 342 and a second pin couples second end 334 of shaft 336 to bearing 344. A generally linear elongate pointer 346 includes a proximal end coupled to first end 334 of helix 328. A counterweight 348, such as a plate-like member, is coupled to second end 334 of shaft 336 and the proximal end of pointer 346 may be coupled to counterweight 348. Counterweight 348 extends outwardly from axis 272 in an opposite direction from which pointer 346 extends from axis 272 such that counterweight 348 counter balances the weight of pointer 346. Helix 328, pointer 346 and counterweight 348 are conjointly rotatable and pivotable about axis 272 with respect to housing 284.

The assembly comprising housing 284, helix 328 and pointer 346 is removably coupled to bracket 250 by inserting first end 286 of housing 284 through opening 266 in bracket 250, and inserting stop members 310 respectively through slots 274 in opening 266. Housing 284 is then rotated about axis 272 in a generally clockwise direction as viewed in FIG. 41 such that bracket 250 is located in gaps 320 between stop members 310 and clip members 312 and projections 276A and 276B are respectively located in detents 318 of clip members 312. Clip members 312 releasably secure housing 284 to bracket 250. The assembly comprising housing 284, helix 328 and pointer 346 may thereby be selectively removed and replaced from bracket 250 for repair or replacement.

Gage 10 includes a scale plate 350 that overlies second end 254 of bracket 250 and that is coupled to bracket 250. Scale plate 350 includes a generally linear bottom edge 351 adapted to engage projections 352A and 352B of bracket 250. Scale plate 350 may be fastened to bracket 250 with fasteners that extend through apertures 354A-B in bracket 250. Scale plate 350 may include a scale for indicating a sensed pressure by the rotational position of the distal end of pointer 346 with respect to the scale.

Gage 10 also includes a cap 360, as shown in FIGS. 32-34, configured to overlie and be coupled to first end 252 of bracket 250. The rear of cap 360 includes a pair of spaced apart detent members 362 configured to releasably grip opposing side edges of bracket 250 therebetween, and a pair of spaced apart posts 364 adapted to engage top surface 270 of bracket 250 when cap 360 is coupled to bracket 250. Cap 360 includes a bore 368 configured to receive the top end of zero set screw 262 such that the top of zero set screw 262 may be accessed through bore 368 when cover 16 is removed from base member 18. The rear of cap 360 also includes a pair of spaced apart pointer stop members 370. Pointer stop members 370 are configured to engage pointer 346 as pointer 346 pivots about axis 272 to limit the rotational or pivotal range of movement of pointer 346. Cap 360 is formed from a plastic material. Cap 360 is snap fit to bracket 250 such that cap 360 may be removed and replaced as required.

First fluid chamber 146 is adapted to be placed in fluid communication with a first fluid having a first pressure through first fluid passageway 100, and second fluid chamber 148 is adapted to be placed in fluid communication with a second fluid having a second pressure through second fluid passageway 112. An increase in the pressure of the first fluid in the first fluid chamber 146 with respect to the second pressure of the second fluid in the second fluid chamber 148 will cause the diaphragm 130, including diaphragm plate 132, post 134 and connector member 138, to move along axis 48 in a first direction toward beam 174 such that diaphragm 130 resiliently bends beam 174 along axis 184 in a direction toward bracket 250 and away from end wall 34. Conversely, a decrease in the pressure of the first fluid in the first fluid chamber 146 with respect to the pressure of the second fluid in the second fluid chamber 148 will result in the diaphragm 130, including plate 132, post 134 and connector member 138, moving along axis 48 in a second direction, opposite the first direction, away from beam 174 and toward end wall 34. Once beam 174 reaches its non-biased position, continued movement of diaphragm 130 in the second direction will pull beam 174 toward end wall 34 of base member 18 and away from bracket 250 due to the magnetic connection between connector member 138 of diaphragm 130 and attachment magnet 208 coupled to beam 174 of motion detection mechanism 156. The generally spherical surface of connector member 138 engages the generally planar surface of attachment magnet 208 with a point of contact. This point of contact allows diaphragm 130 to move forward or backward in the first direction or second direction generally parallel to and along axis 48 in the most natural position of diaphragm 130. Diaphragm 130 is thereby adapted to push or pull on beam 174 in response to pressure changes between first fluid chamber 146 and second fluid chamber 148.

Displacement of diaphragm 130 in response to a sensed pressure causes beam 174 to bend or flex thereby displacing drive magnet 206 generally parallel to axis 48 to a position that corresponds with the pressure sensed by diaphragm 130. The generally linear displacement and resulting position of drive magnet 206 corresponds to the differential pressure applied to diaphragm 130. Drive magnet 206 is located adjacent to, but is spaced apart from helix 328 by an air gap, such that helix 328 is magnetically coupled to drive magnet 206. A magnetic circuit is formed between drive magnet 206 and helix 328 that spans the air gap therebetween. The generally linear movement of drive magnet 206 in response to linear movement of diaphragm 130 causes an angular or rotational displacement or movement of helix 328 and thereby pointer 346 about axis 272. Pointer 346 thereby provides a visual indication with respect to the scale on scale plate 350 of the pressure sensed by diaphragm 130.

An alternate embodiment of the gage of the present disclosure is shown in FIGS. 43 and 44 and is identified with the reference number 380. Gage 380 and gage 10 are constructed similar to one another and similar components are marked with the same reference number. Gage 380 operates in the same manner as gage 10. The only difference between gage 380 and gage 10 is in the construction of seal member 382 of gage 380 and seal member 20 of gage 10. Seal member 382 includes a first fluid conduit 384 including first fluid passageway 100 and first port 102 at the distal end of first fluid conduit 384. Seal member 382 also includes a second fluid conduit 386 including second fluid passageway 112 and first port 114 at the distal end of second fluid conduit 386. First fluid passageway 100 of gage 380 is in fluid communication with first fluid chamber 146, and second fluid passageway 112 of gage 380 is in fluid communication with second fluid chamber 148, in the same manner as in gage 10. Second fluid conduit 386 includes a proximal end attached to ear 106. First and second fluid conduits 384 and 386 extend generally parallel to one another and generally parallel to axis 32 as they extend outwardly from their proximal ends toward their distal ends, rather than extending generally transversely to axis 32 as in gage 10.

As shown in FIG. 44, gage 380 is removably coupled to a mounting apparatus 400. Gage 10 may also be removably coupled to mounting apparatus 400 in the same manner as gage 380. As shown in FIGS. 46-48, mounting apparatus 400 includes a generally planar and circular plate 402 having a generally planar interior surface 404 and a generally planar exterior surface 406 spaced apart from and generally parallel to interior surface 404. Plate 402 includes a central axis 408 that extends generally transverse to plate 402 and to interior and exterior surfaces 404 and 406. Plate 402 includes a generally circular peripheral edge 410 that extends generally concentrically about axis 408. Peripheral edge 410 includes a plurality of elongate notches 412 generally uniformly spaced apart from one another about axis 408. As shown in FIGS. 46 and 48, peripheral edge 410 includes four notches 412, although additional or fewer notches may be used. Each notch 412 extends along peripheral edge 410 between a first end 414 and a second end 416.

Plate 402 includes a generally circular first access aperture 418 and a generally circular second access aperture 420. As shown in FIG. 44, first access aperture 418 is adapted to align with first fluid conduit 384 and second access aperture 420 is adapted to align with second fluid conduit 386, when gage 380 is coupled to mounting apparatus 400 such that fluid supply conduits may be respectively connected to first fluid conduit 384 and second fluid conduit 386 through first and second access apertures 418 and 420. Plate 402 includes a plurality of mounting apertures 424, such as three mounting apertures 424, that are generally uniformly spaced apart from one another about axis 408 and inwardly from peripheral edge 410. Lugs 426 are located on opposite sides of each mounting aperture 424 and extend outwardly from interior surface 404 of plate 402. Each mounting aperture 424 is adapted to receive a fastener, such as a bolt or screw, for use in attaching mounting apparatus 400 to a fixture, such as a panel, wall or the like, with exterior surface 406 of plate 402 located adjacent the fixture. The head of the fastener is located between lugs 426 that are adjacent each mounting aperture 424. First and second access apertures 418 and 420 of plate 402 may be aligned with counterpart apertures in the fixture through which fluid supply conduits may extend.

Mounting apparatus 400 includes a plurality of locking members 430 attached to plate 402. As shown in the drawing figures, four locking members 430 are attached to plate 402, although fewer or additional locking members may be used. Locking members 430 are spaced apart from one another generally uniformly about axis 408 and are located adjacent peripheral edge 410 of plate 402. Each locking member 430 is attached to interior surface 404 of plate 402 adjacent a respective notch 412. Each locking member 430 includes an elongate resiliently flexible lever arm 432 extending between a first end 434 and a second end 436. First end 434 of lever arm 432 is attached to a distal end of a post 438. A proximal end of post 438 is attached to interior surface 404 of plate 402 adjacent first end 414 of a notch 412 and is spaced slightly inwardly from peripheral edge 410 of plate 402. Post 438 extends generally perpendicular to interior surface 404 of plate 402 and generally parallel to axis 408. Lever arm 432 extends generally perpendicular to post 438 and generally parallel to and spaced apart from interior surface 404 of plate 402. Lever arm 432 includes an interior surface 440 and an exterior surface 442. Second end 436 of lever arm 432 includes an end surface 444 that extends between interior surface 440 and exterior surface 442. End surface 444 is inwardly inclined as it extends from external surface 442 to internal surface 440. Lever arm 442 and its internal and external surfaces 440 and 442 are curved to conform to respective radii from axis 408.

Each locking member 430 includes a stop member 448 attached to second end 436 of lever arm 432 and that extends outwardly from external surface 442 of lever arm 432. Stop member 448 is disposed above notch 412 and adjacent second end 416 of notch 412. Stop member 448 includes a generally planar engagement surface 450. Engagement surface 450 is generally coplanar with the bottom surface of lever arm 432 and is spaced apart from and generally parallel to the plane containing interior surface 404 of plate 402. Stop member 448 includes an inclined biasing surface 452 that extends downwardly and outwardly from a top edge of exterior surface 442 of lever arm 432 to an outer surface 454. Outer surface 454 is located at an outer edge of engagement surface 450 and extends upwardly therefrom to biasing surface 452. Outer surface 454 is generally perpendicular to engagement surface 454. Stop member 448 and second end 436 of arm 432 are movable between an unbiased extended position as shown in FIG. 48 and a retracted position wherein stop member 448 and second end 436 of lever arm 432 are moved from the retracted position toward axis 408 in a direction generally parallel to interior surface 404 of plate 402 by resiliently flexing lever arm 423. Lever arm 432 resiliently biases stop member 448 and second end 436 of lever arm 432 toward the extended position.

As previously described, mounting apparatus 400 may be attached to a fixture by use of fasteners that extend through mounting apertures 424. Mounting apparatus 400 may alternatively be connected to the fixture by other fastening means such as an adhesive. Gage 10 or gage 380 is then aligned with mounting apparatus 400 such that axis 32 is substantially coaxial with axis 408 and such that each mounting aperture 35 of gage 10 or 380 is aligned with a respective stop member 448 of a locking member 430 of mounting apparatus 400. Gage 10 or 380 is then manually moved toward mounting apparatus 400 along axis 408 whereupon rim 30 of base member 18 engages biasing surfaces 452 of stop members 448 of locking members 430. As gage 10 or 380 is further moved toward mounting apparatus 400, rim 30 slides along biasing surfaces 452 of locking members 430 and resiliently moves stop members 448 and second ends 436 of lever arms 432 of locking members 430 inwardly toward axis 408 from their extended positions toward their retracted positions.

When rim 30 of base member 18 engages internal surface 404 of plate 402, rim 30 will have passed beyond stop members 448 such that lever arms 432 will resiliently bias stop members 448 toward the extended positions and into respective mounting apertures 35 of base member 18. Stop members 448 project into mounting apertures 35 such that engagement surface 450 of each stop member 448 is adapted to engage distal edge 37 of mounting aperture 35 to thereby prevent removal of gage 10 or 380 from mounting apparatus 400 along axis 408. Fluid supply conduits may then be connected to the first and second fluid conduits 98 and 110 of gage 10 through notch 70, or to first and second fluid conduits 384 and 386 of gage 380 through access apertures 418 and 420.

When desired, gage 10 or 380 may be selectively removed from mounting apparatus 400 by manually pressing on outer surfaces 454 of stop members 448 with a tool, such as a screw driver or the like, to inwardly flex or bend second ends 436 of lever arms 432 toward the retracted positions such that stop member 448 and engagement surface 450 are removed from mounting apertures 35 of base member 18 whereby gage 10 or 380 may then be removed away from mounting apparatus 400 along axis 408.

A gage 10 may be converted to gage 380 for rear mounting of fluid supply conduits by replacing seal member 20 with seal member 382. Similarly, a gage 380 may be converted to gage 10 for side mounting of fluid supply conduits by replacing seal member 382 with seal member 20.

Various features of the invention have been particularly shown and described in connection with the illustrated embodiments of the invention, however, it must be understood that these particular arrangements merely illustrate, and that the invention is to be given its fullest interpretation within the terms of the appended claims.

The invention claimed is:

1. A mounting apparatus for removably mounting a gage to a fixture, said mounting apparatus comprising:
    a plate having an interior surface, an exterior surface, a central axis, and a peripheral edge extending about said central axis of said plate, said plate adapted to be attached to the fixture;
    a plurality of locking members attached to said plate adjacent said peripheral edge, each said locking member including a post extending outwardly from said interior surface of said plate, and a resiliently flexible lever arm extending outwardly from a distal end of said post, said lever arm including a first end attached to said post and a second end, said second end of said lever arm including a stop member adapted to selectively engage the gage and thereby mount the gage to the mounting apparatus and to the fixture, said stop members being selectively movable to a retracted position wherein said stop members are disengaged from the gage such that the gage may be removed from the mounting apparatus and the fixture.

2. The mounting apparatus of claim 1 wherein said plate includes one or more apertures adapted to receive one or more fluid conduits.

3. The mounting apparatus of claim 1 wherein each said stop member includes a biasing surface adapted to engage the gage and bias said second end of said lever arm and said stop member inwardly toward a retracted position.

* * * * *